(12) United States Patent
Foran et al.

(10) Patent No.: US 11,996,576 B2
(45) Date of Patent: May 28, 2024

(54) IMPACT RESISTANT FRAME OF BATTERY CONTAINMENT SYSTEM

(71) Applicant: Continental Structure Plastics, Inc., Auburn Hills, MI (US)

(72) Inventors: Hugh Foran, Auburn Hills, MI (US); Patrick Durham, Auburn Hills, MI (US); Masatomo Teshima, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 386 days.

(21) Appl. No.: 17/463,904

(22) Filed: Sep. 1, 2021

(65) Prior Publication Data
US 2022/0006151 A1    Jan. 6, 2022

Related U.S. Application Data

(60) Provisional application No. 63/047,957, filed on Jul. 3, 2020.

(51) Int. Cl.
| | |
|---|---|
| *H01M 50/242* | (2021.01) |
| *B60K 1/04* | (2019.01) |
| *B60L 50/60* | (2019.01) |
| *B60L 50/64* | (2019.01) |
| *H01M 50/24* | (2021.01) |

(52) U.S. Cl.
CPC ............ *H01M 50/242* (2021.01); *B60K 1/04* (2013.01); *B60L 50/64* (2019.02); *B60L 50/66* (2019.02); *H01M 50/24* (2021.01); *H01M 2220/20* (2013.01)

(58) Field of Classification Search
CPC .................................................. H01M 50/242
See application file for complete search history.

(56) References Cited

U.S. PATENT DOCUMENTS

| | | | | |
|---|---|---|---|---|
| 2002/0149214 A1* | 10/2002 | Evans | ..................... | B60R 19/18 |
| | | | | 293/133 |
| 2005/0280269 A1* | 12/2005 | Evans | ..................... | B60R 19/18 |
| | | | | 293/120 |
| 2008/0185851 A1* | 8/2008 | Evans | ..................... | B60R 19/18 |
| | | | | 293/120 |
| 2009/0206618 A1* | 8/2009 | Ralston | ................... | B60R 19/18 |
| | | | | 293/120 |
| 2018/0069205 A1* | 3/2018 | Maier | ................. | H01M 50/242 |
| 2020/0152929 A1* | 5/2020 | Collins | ............... | H01M 10/625 |

(Continued)

*Primary Examiner* — Erez Gurari
(74) *Attorney, Agent, or Firm* — MaxGoLaw PLLC

(57) ABSTRACT

A high strength frame of a sealable containment system is provided for containing and protecting energy cells or batteries. The protection provided by the high strength frame provides impalement resistance, impact resistance, fire resistance, and fluid penetration prevention. The frame includes a shock structure/energy absorber to protect the battery from forces during potential impacts with other vehicles or objects. The frame of a battery containment system is further designed to resist impalements in order to protect the batteries. Furthermore, because vehicle batteries are prone to extreme fire in the event of an impact or impalement, the containment system provides a sealed battery environment to keep fluid and moisture out during normal operation and to limit oxygen in the event of a battery fire.

19 Claims, 22 Drawing Sheets

(56) References Cited

U.S. PATENT DOCUMENTS

| | | | | |
|---|---|---|---|---|
| 2020/0227705 | A1* | 7/2020 | Grace | B60L 3/0007 |
| 2021/0098758 | A1* | 4/2021 | Kim | H01M 10/6561 |
| 2021/0221436 | A1* | 7/2021 | Tsuyuzaki | B62D 25/025 |
| 2022/0006150 | A1* | 1/2022 | Foran | H01M 50/231 |
| 2022/0006151 | A1* | 1/2022 | Foran | B60K 1/04 |
| 2022/0013841 | A1* | 1/2022 | Greber | H01M 10/6557 |
| 2022/0037726 | A1* | 2/2022 | Choi | H01M 10/6556 |
| 2022/0063390 | A1* | 3/2022 | Park | B60L 50/66 |
| 2022/0089009 | A1* | 3/2022 | Marshall | H01M 50/249 |
| 2022/0216560 | A1* | 7/2022 | Teshima | H01M 50/282 |
| 2022/0297524 | A1* | 9/2022 | Günther | H01M 50/20 |
| 2022/0344752 | A1* | 10/2022 | Ishitobi | H01M 50/121 |
| 2023/0014338 | A1* | 1/2023 | Greber | H01M 10/6551 |
| 2023/0023909 | A1* | 1/2023 | He | H01M 50/244 |
| 2023/0073258 | A1* | 3/2023 | Mogi | H01M 10/6554 |
| 2023/0117003 | A1* | 4/2023 | Spangler | H01M 50/264 |
| | | | | 429/99 |
| 2023/0137848 | A1* | 5/2023 | Naruke | H01M 50/264 |
| | | | | 180/68.5 |
| 2023/0231223 | A1* | 7/2023 | Tan | H01M 10/613 |
| | | | | 429/120 |
| 2023/0246278 | A1* | 8/2023 | Yoshida | H01M 50/233 |
| | | | | 429/7 |
| 2023/0271504 | A1* | 8/2023 | Wan | H01M 10/482 |
| | | | | 701/22 |
| 2023/0275304 | A1* | 8/2023 | Mogi | H01M 50/249 |
| | | | | 429/163 |
| 2023/0335846 | A1* | 10/2023 | Jeon | H01M 10/6556 |
| 2023/0335848 | A1* | 10/2023 | Seok | H01M 50/20 |

\* cited by examiner

FIG. 4K 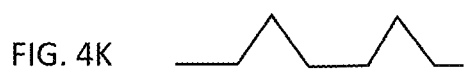  FIG. 5K
FIG. 4L   FIG. 5L
FIG. 4M   FIG. 5M
FIG. 4N 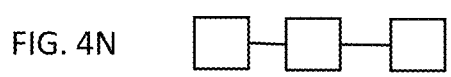  FIG. 5N
FIG. 4O   FIG. 5O
FIG. 4P   FIG. 5P
FIG. 4Q 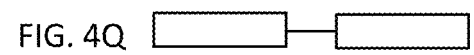  FIG. 5Q
FIG. 4R   FIG. 5R

IMPACT RESISTANT FRAME OF BATTERY CONTAINMENT SYSTEM

CROSS REFERENCE TO RELATED APPLICATIONS

This application claims priority benefit of U.S. Provisional Application Ser. No. 63/047,957 filed 3 Jul. 2020, the contents of which are hereby incorporated by reference.

FIELD OF THE INVENTION

The present invention in general relates to a high strength frame of a containment system and in particular to a high strength frame of a containment system for containing for example, a fuel cell or battery, to provide impalement resistance, impact resistance, fire resistance, and fluid penetration prevention.

BACKGROUND OF THE INVENTION

Weight savings in the automotive, transportation, aerospace, and logistics-based industries has been a major focus in order to make more fuel-efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for reasons that include materials which are stronger, lighter, or less expensive when compared to traditional materials of steel or aluminum. Still another advantage over metals is reduced corrosion, leading to longer operational life and reduced maintenance costs.

Composites typically have two constituent materials: matrix and reinforcement. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers, while carbon fibers are known to be high strength and low weight reinforcements.

Weight savings are particularly important for electric and hybrid vehicles powered with energy cells employing battery technologies in order to achieve greater vehicle driving range per charge. However, unique problems associated with some components of electric and hybrid vehicles have hindered the ability to use composite materials for some applications on hybrid or electric vehicles. For example, batteries of electric and hybrid vehicles present unique safety considerations owing to the high voltages of the batteries, chemicals employed in the battery technologies, combustion and fire risks associated with the batteries, and potential fume encounters if the batteries are broken or damaged. Therefore, batteries of electric and hybrid vehicles generally require protective containers designed to shield batteries from forces they may otherwise experience during an impact or crash event.

Generally, such protective containers are high strength boxes formed of welded metals, which are heavy, prone to corrosion, and have been found to be water penetrable in at least the area of the welds. Attempts have been made to form protective battery containers from composite materials to reduce the weight of such containers. However, such containers are usually joined with metal bolts, which require additional machining of through holes in the composite material of the container, which is difficult because of the high strength of the material through which the holes must be drilled, placement of the bolts in the through holes, and securing of the bolts with nuts, leading to complex manufacturing techniques, slow manufacturing throughputs, and high manufacturing costs. Additionally, typical battery containment boxes formed of composite material are prone to degraded seals and failure given that the metal bolts and nuts used to join portions of the boxes together rub against and wear down the composite material near the bolt holes. Another drawback of typical battery composite material containment boxes is that the boxes do not always provide sufficient protection of the batteries contained therein. That is, the batteries in such boxes are at risk of damage and fire in the event of an impact or impalement.

Thus, there exists a need for a battery containment system design that utilizes composite materials to lower the weight of the components thereof, while providing sufficiently high strength and impact resistance, increasing manufacturing throughput and improving the seal and performance of the battery containment system.

SUMMARY OF THE INVENTION

A frame is provided for a battery containment system. The frame includes an interior component, a first support, and a first energy absorption component. The interior component hays a bottom portion, a plurality of wall portions extending from the bottom portion, and a plurality of upper portions each extending from one of the wall portions, the bottom portion and the plurality of wall portions defining a cavity. The first support component has a base portion, a wall portion extending from the base portion of the first support component, and an upper end extending from the wall portion of the first support component. The base portion of the first support component partially underlying the bottom portion of the interior component and the upper end of the first support component underlying and attached to the upper portion of the interior component. The interior component and the first support component define a first volume therebetween. The first energy absorption component has a base portion, a wall portion extending from the base portion of the first energy absorption component, an upper portion extending from the wall portion of the first energy absorption component, and an attachment flange extending from the upper portion of the first energy absorption component. The base portion of the first energy absorption component is attached to the first support component and the attachment flange of the first energy absorption component is attached to the first support component, where the first support component and the first absorption component define a second volume therebetween.

A battery containment system is provides that includes the frame as described, a unitary battery tray, and a cover. The unitary battery tray has a bottom and a plurality of walls extending from the bottom of the tray and defines a cavity within the tray, the tray being configured to nest within the cavity of the frame. The cover has a cover body portion and a first flange extending from the cover body portion, the cover body portion configured to overlie the cavity within the tray and the plurality of walls of the tray, the first flange of the cover configured to extend beyond the plurality of walls of the tray.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

Figure 1:
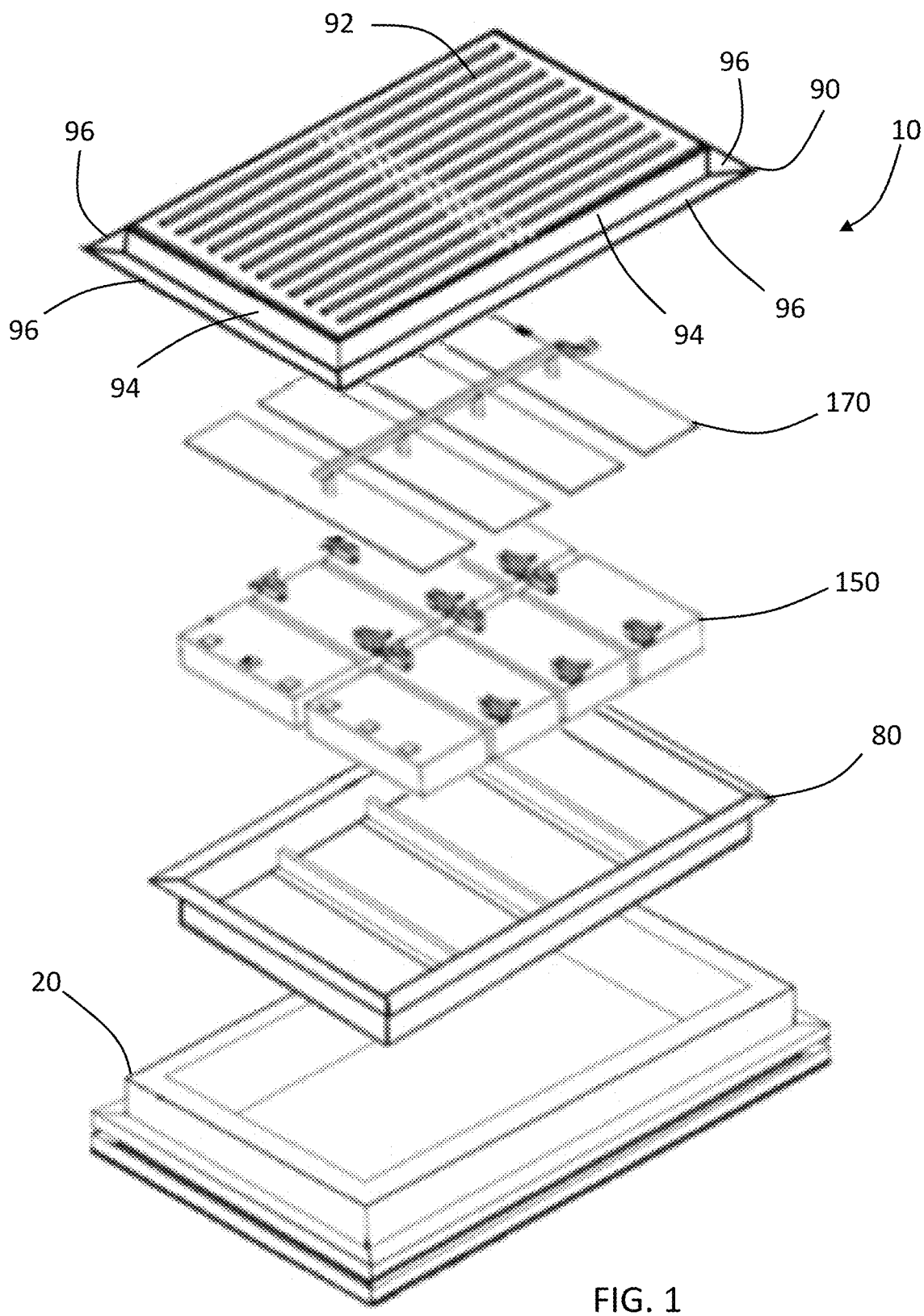
FIG. 1 is an exploded perspective view of a battery containment system according to embodiments of the present invention.

The present invention has utility as a high strength frame of a sealable containment system for containing and protecting energy cells or batteries that provides impalement resistance, impact resistance, fire resistance, and fluid penetration prevention. Battery cases are getting bigger year by year due to the increase in amount of batteries installed. For example, the length of the battery case in the vehicle width direction is often 70% or more with respect to the vehicle width, and sometimes 80% or more. For this reason, when a large battery case is mounted in the lower part of the vehicle, a larger load is input to the battery case at the time of a collision rather than previous battery cases. Therefore, embodiments of the inventive frame include a shock structure/energy absorber to protect the battery from forces during potential impacts with other vehicles or objects. Additionally, because of the position and size of a battery case on vehicles, the batteries are susceptible to impalement from road or collision debris. Therefore, the inventive frame of a battery containment system is designed to resist such impalements in order to protect the batteries. Furthermore, because vehicle batteries are prone to extreme fire in the event of an impact or impalement, embodiments of the present inventive containment system provide a sealed battery environment to keep fluid and moisture out during normal operation and to limit oxygen in the event of a battery fire.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below. As used in the description of the invention and the appended claims, the singular forms "a," "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

As used herein "fluid penetration" refers to a single piece or joined piece that prevents unintended transit of gaseous or liquid coolants through a containment system in general.

Referring now to the figures, a battery containment system 10 according to embodiments of the present invention includes a high strength impact resistant frame 20, a tray 80, and a cover 90. The frame 20, the tray 80, and the cover 90 are configured to be assembled in such a way as to form a high strength, light weight containment system 10 that provides impalement resistance, impact resistance, fire resistance, and fluid penetration prevention to contents contained within the system 10. The frame 20 includes an energy absorption component 30 that imparts impact resistance to the frame 20 and system 10. The tray 80 is configured to nest within a cavity 29 of the frame 20 and to contain a plurality of batteries 150 therein. The cover 90 is configured cover the plurality of batteries 150 contained within the tray 80 and to engage with the frame 20 or the tray 80 to seal the system 10, thereby preventing fluid penetration into and out of the space in which the plurality of batteries 150 is contained.

Figure 18:
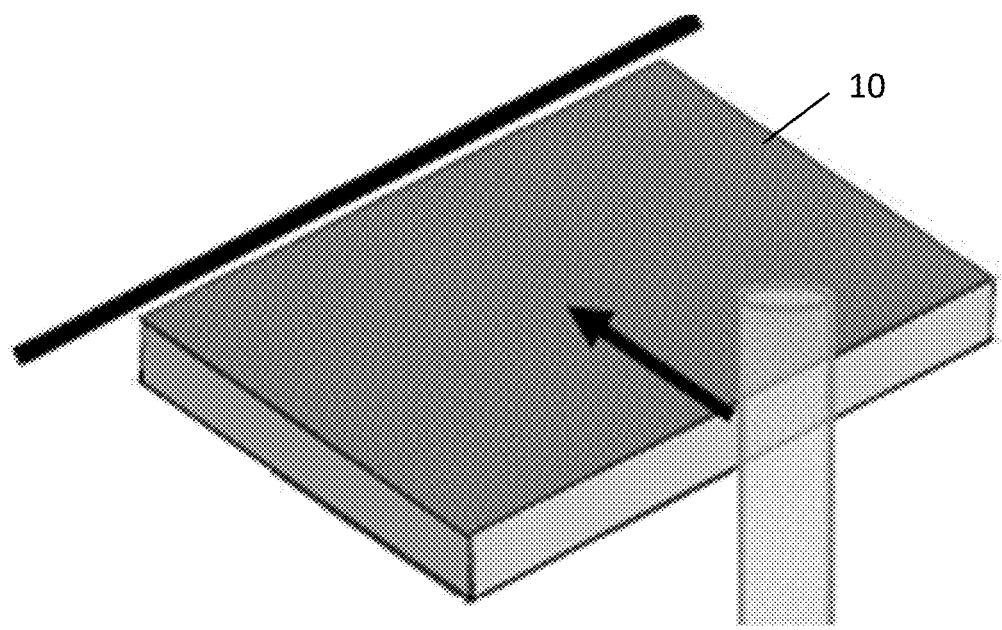
FIG. 18 is a schematic drawing of a pole test conducted on embodiments of the inventive battery containment system.

It is appreciated that the relative placement of an inventive system 10 on a vehicle largely dictates the need for additional impact resistance. By way of example, a system 10 surrounded by a vehicle chassis has reduced or no need for energy absorption components, while in contrast, placement under a vehicle side door has a considerable need to inhibit impact induced intrusion into the contained volume of a system 10. The containment system 10 is particularly suitable for containing batteries of a hybrid or electric vehicle. The battery containment system 10 seals the batteries off from the external environment, protects the batteries from impalement from objects such as crash and road debris, and absorbs and dissipates kinetic energy experienced during a crash or impact event. In particular, the battery containment system 10 according to embodiments of the present invention exhibits minimal (less than 40%) intrusion into the enclosure and high resistance (at least 80 kN) to the impact when subjected to a quasi-static load by a 10 inch (25 cm) diameter rigid column located at the center of the battery and traveling perpendicular into a predominate longitudinal or lateral edge of the battery containment system 10, known in the industry as the pole test and which is schematically shown in FIG. 18. Additionally, during such crash event or impacts, the contents of the system 10, such as batteries contained therein experience limited deformation of the cell perimeter and the high voltage wiring connecting the batteries to other systems of the electric or hybrid vehicle experiences little to no loading.

Figure 2:
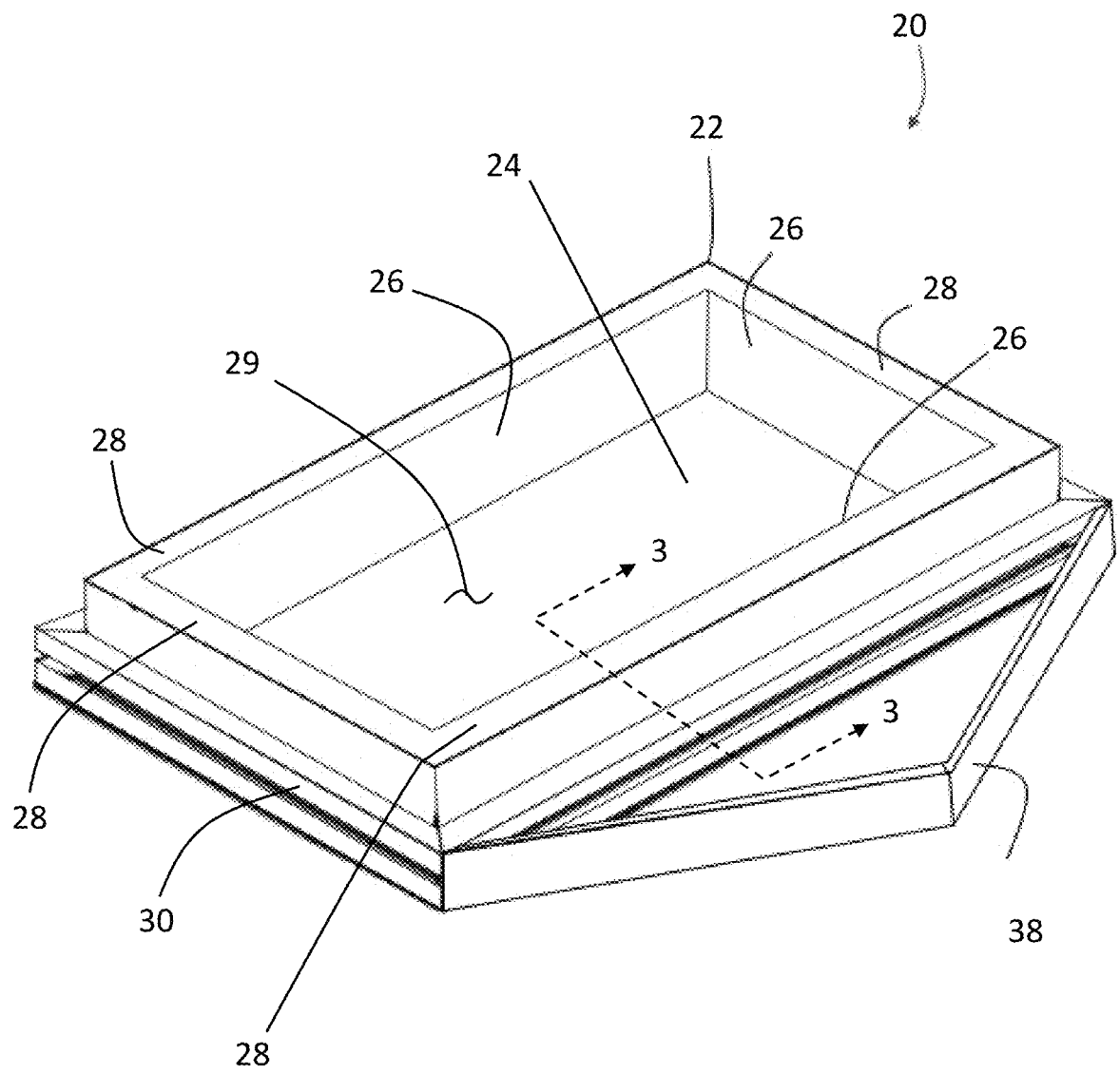
FIG. 2 is a perspective view of a high strength frame of a battery containment system according to an embodiment of the present invention.
Figure 3:
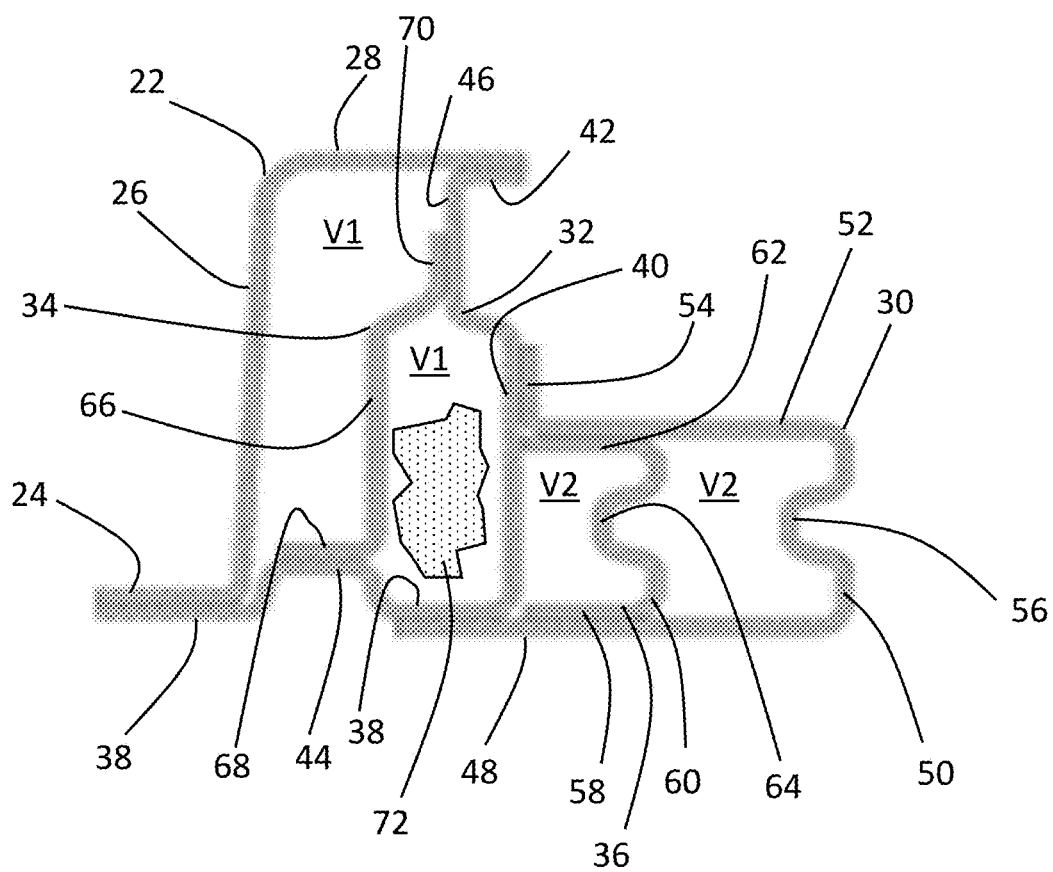
FIG. 3 is cross sectional view of the high strength frame of FIG. 2.

As shown in FIG. 2, the inventive frame 20 of a containment system 10 includes an interior component 22 and a first energy absorption component 30. Additionally, as shown in FIG. 3, the inventive frame 20 also includes a first support component 32. According to embodiments, the frame 20 includes a second support component 34, a second energy absorption component 36, and/or an external bumper 38 to further increase the strength and impact resistance of the frame 20.

The interior component 22 includes a bottom portion 24, a plurality of wall portions 26 extending from the bottom portion 24, and a plurality of upper portions 28 each extending from one of the wall portions 28. The bottom portion 24 and the plurality of wall portions 26 defining a cavity 29. According to embodiments, the bottom 24, the walls 26, and the upper portions 28 may be formed from separate pieces of material that are joined together. Alternatively, the interior component 22 is integrally formed by a molding process, an extrusion process, or a bending process. According to embodiments, the interior component 22 of the frame 20 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. According to embodiments, each of the wall portions 26 extend perpendicularly from the bottom portion 24 of the interior component 22. Alternatively, the walls 26 extend from the bottom portion 24 at an angle that is greater than 90 degrees. As shown in FIG. 2, the interior component 22 of the frame 20 has a rectangular shape, however, other shapes are also contemplated. According to embodiments, each of the upper portions 28 extend perpendicularly from one of the wall portions 26. As shown in FIGS. 2-3, the upper portions 28 extend away from the cavity 29 defined within the interior component 22.

As best shown in FIG. 3, the frame 20 includes a first support component 32 that includes a base portion 38, a wall portion 40 extending from the base portion 38 of the first support component, and an upper end 42 extending from the wall portion 40 of the first support component. According to embodiments, the wall portion 40 perpendicularly extends from the base portion 38 of the first support component 32. The base portion 38 of the first support component is positioned such that it partially underlies the bottom portion 24 of the interior component 22, which creates a double layer of material at the bottom of the frame 20 to increase the impalement resistance of the frame 20. According to embodiments, the base 38 of the first support component 32 is attached to the base 24 of the interior component 22, for example by an adhesive or by at least one weld. The upper end 42 of the first support component 32 is positioned such that it underlies and is attached to the upper portion 28 of the interior component 22. According to embodiments, the upper end 42 of the first support component 32 is attached to the upper portion 28 of the interior component 22 by an adhesive or by at least one weld. Accordingly, the interior component 22 and the first support component 32 define a first volume V1 therebetween. According to embodiments, the base 38, the wall 40, and the upper end 42 may be formed from separate pieces of material that are joined together. Alternatively, the first support component 32 is integrally formed by a molding process, an extrusion process, or a bending process. According to embodiments, the first support component 32 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. According to embodiments, the base 38 of the first support component 32 includes an upwardly projecting ridge that projects into the first volume V1. This upwardly projecting ridge 44 is designed to further increase the strength of the first support component 32 and therefore the strength of the frame 20. Similarly, according to embodiments, the wall portion 40 of the first support component 32 includes an inwardly projecting ridge 46 that projects into the first volume V1 to further increase the strength of the first support component 32. As shown in FIGS. 3, the inwardly projecting ridge 46 of the wall portion 40 of the first support component 32 is positioned adjacent to the upper end 42 of the first support component 32. According to embodiments, first support component 32 externally surrounds said interior component 22.

As shown in FIGS. 2-3, the frame 20 includes a first energy absorption component 30, which according to embodiments externally surrounds the first support component 32. The first energy absorption component 30 includes a base portion 48, a wall portion 50 extending from the base portion 48 of the first energy absorption component 30, an upper portion 52 extending from the wall portion 50 of the first energy absorption component 30, and an attachment flange 54 extending from the upper portion 52 of the first energy absorption component 30. According to embodiments, wall portion 50 of the first energy absorption component 30 extends perpendicularly from the base 48 of the first energy absorption component 30. According to embodiments, the upper portion 52 of the first energy absorption component 30 extends perpendicularly from the wall portion 50 of the first energy absorption component 30. The base portion 48 of the first energy absorption component 30 is attached to the first support component 32 and the attachment flange 42 of the first energy absorption component 30 is attached to the first support component 32. Accordingly, the first support component 32 and the first absorption component 30 define a second volume V2 therebetween. According to embodiments, the base portion 48 of the first energy absorption component 30 is attached to the base portion 38 of the first support component 32, for example by an adhesive or by at least one weld. According to embodiments, the attachment flange 54 of the first energy absorption component 30 is attached to the wall portion 40 of the first support component 54, for example by an adhesive or by at least one weld. According to embodiments, the base 48, the wall 50, the upper portion 52, and the attachment flange 54 of the first energy absorption component 30 may be formed from separate pieces of material that are joined together. Alternatively, the first energy absorption component 30 is integrally formed by a molding process, an extrusion process, or a bending process. According to embodiments, the first energy absorption component 30 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. According to embodiments, the wall portion 50 of the first energy absorption component 30 includes an inwardly projecting ridge 56 that extends into the second volume V2. According to embodiments, the inwardly projecting ridge 56 is positioned in the center of the wall portion 50 of the first energy absorption component 30.

As shown in FIG. 3 embodiments of the inventive frame 20 additionally include a second energy absorption component 36. The second energy absorption component 36 is disposed within the second volume V2 between the first support component 32 and the first energy absorption component 30. According to embodiments, the second energy absorption component 36 includes a base portion 58, a wall portion 60 extending from the base portion 58 of the second energy absorption component 36, and an upper portion 62 extending from the wall portion 60 of the second energy absorption component 36. According to embodiments, the wall portion 60 perpendicularly extends from the base portion 58 of the second energy absorption component 36. According to embodiments, the upper portion 62 perpendicularly extends from the wall portion 60 of the second energy absorption component 36. According to embodiments, the base 58, the wall 60, and the upper portion 62 of the second energy absorption component 36 may be formed from separate pieces of material that are joined together. Alternatively, the second energy absorption component 36 is integrally formed by a molding process, an extrusion process, or a bending process. According to embodiments, the second energy absorption component 36 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. According to embodiments, the wall portion 60 of the second energy absorption component 36 includes an inwardly extending ridge 64, which according to embodiments is positioned in the center of the wall 60 of the second energy absorption component 36. According to embodiments, the second energy absorption component 36 externally surrounds the first support component 32.

As shown in FIG. 3 embodiments of the inventive frame 20 additionally include a second support component 34 disposed within the first volume V1 between the interior component 22 and the first support component 32. According to embodiments, the second support component 34 has a wall portion 66, a first attachment flange 68 extending from a first end of the wall portion 66 of the second support component 34, and a second attachment flange 70 extending from a second end of the wall portion 66 of the second support component 34. According to embodiments, the first attachment flange 68 perpendicularly extends from the wall portion 66 of the second support component 34. According to embodiments, the second attachment flange 70 parallelly extends from the wall portion 66 of the second support component 34. The first attachment flange 68 of the second support component 34 is attached to the base portion 38 of the first support component 32 and the second attachment flange 70 of the second support component 34 is attached to the wall portion 40 of the first support component 32. According to embodiments, the first attachment flange 68 is attached to the base 38 of the first support component 32 at the upwardly extending ridge 44. According to embodiments, the first attachment flange 68 is attached to the base 38 of the first support component 32 by an adhesive or by at least one weld. According to embodiments, the second attachment flange 70 is attached to the wall 40 of the first support component 32 at the inwardly projecting ridge 46. According to embodiments, the second attachment flange 70 is attached to the wall 40 of the first support component 32 by an adhesive or by at least one weld. According to embodiments, the second support component 34 externally surrounds the interior component 22. According to embodiments, the first attachment flange 68, the wall 66, and the second attachment flange 70 of the second support component 34 may be formed from separate pieces of material that are joined together. Alternatively, the second support component 34 is integrally formed by a molding process, an extrusion process, or a bending process. According to embodiments, the second support component 34 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum.

As shown in FIG. 2, embodiments of the frame 20 include a bumper 38 attached to the first energy absorption component 30. According to embodiments, the bumper 38 is attached by an adhesive or by welding. According to embodiments, the bumper 38 is attached to the wall portion 50 of the first energy absorption component 30. The bumper 38 is attached such that it extends away from the frame 20. According to embodiments, the bumper 38 may be formed from separate pieces of material that are joined together. Alternatively, the bumper 38 is integrally formed by a molding process, an extrusion process, or a bending process. According to embodiments, the bumper 38 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. As shown in FIG. 2 the bumper 38 is only shown along a single side of the frame 20 for visual clarity; however, it will be understood that a bumper 38 can be included along any or all sides of the frame 20. The bumper 38 functions to add strength to the frame 20 and to deflect impact objects away from the center of the frame 20 given the angular shape of the bumper 38.

According to embodiments, the frame 20 is coated in a coating that is at least one of fire resistant, fire retardant, phenolic, or electromagnetic interference-radiofrequency interference (EMI-RFI) shielding. It is appreciated that coating as used in this context is intended to include separate layers of material that are applied as a sheet material to a substrate of the system 10.

According to embodiments, the frame 20 additionally includes a third energy absorption component 72 positioned within the first volume V1 and/or the second volume V2. According to embodiments the third energy absorption component 72 is a closed cell structural foam such as PET foam, Polyisocyanurate foam, PVC foam, and Reinforced Polyurethane Foam, or is formed of any of carbon fiber reinforced thermoplastic (CFRTP), aluminum, or steel to have a repeating shape of a predetermined geometry. According to certain inventive embodiments, the third energy absorption component 72 is formed of a carbon fiber reinforced thermoplastic known as SEREEBO(R)™, having composition including Carbon fibers "Tenax" (registered trademark) STS40-24KS (average fiber diameter: 7 .mu.m, single yarn number: 24,000) manufactured by Teijin., Ltd., which had been cut to an average fiber length of 20 mm were used as carbon fibers. Nylon-6 resin A1030 manufactured by Unichika, Ltd. was used. In accordance with the method described in U.S. Pat. No. 8,946,342, there was manufactured a molding material precursor of the carbon fibers and the Nylon-6 resin, in which the carbon fibers had been randomly oriented in two-dimensions. The obtained molding material precursor was heated at 2.0 MPa for 5 minutes with a pressing device heated to 260 degree C. to obtain a CFRTP material.

Figure 4A:
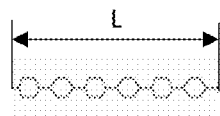
FIGS. 4A-4R show a side view of various configurations of an energy absorption component of a battery containment system according to embodiments of the present invention.

As shown in FIGS. 4A-4R, the repeating shape of the third energy absorption component 72 is any of a closed hexagon (FIG. 4A), a closed circle (FIG. 4E), a closed triangle (FIG. 4L), a closed oval (FIG. 4P), a closed square (FIG. 4N), a closed rectangle (FIG. 4Q), an open semi hexagon (FIGS. 4B, 4C, and 4D), an open semi-circle (FIG. 4F), and open semi oval (FIG. 4G), an open triangle (FIG. 4K), an open semi square (FIG. 4M), and open semi rectangle (FIG. 4R), and a sine wave (FIG. 4O). As shown in FIGS. 4H, 4I, 4J, 8A, and 8B the third energy absorption component 72 is extruded or roll formed elongated forms with a continuous cross section. According to embodiments, press molding enhances production efficiency and is therefore preferred over extruded or roll formed elongated forms. As shown in FIG. 4A the third energy absorption component 72 has a length L measured from a first end to a second end. It will be readily understood that the various configurations of the third energy absorption component 72 shown in FIGS. 4A-4R also have a length L measured from a first end to a second end, however the length L is not shown in all of the figures for clarity. FIGS. 5A-5R show end views of each of the third energy absorption component 72 shown in FIGS. 4A-4R, respectively. As shown in FIG. 5A the third energy absorption component 72 has a width W and a height H. As with the length L, it will be understood that the width W and height H have not been shown in all of the figures for clarity. According to certain inventive embodiments, the length L of the third energy absorption component 72 is 5 to 5000 mm, the width W is 5 to 100 mm, and the height H is 5 to 100 mm. The length, L, width W, and height H of the third energy absorption component 72 generally corresponds to the overall length of the frame 20, height of the walls 26, and the first volume V1 and second volume V2 into which the third energy absorption component 72 is placed.

Figure 6A:
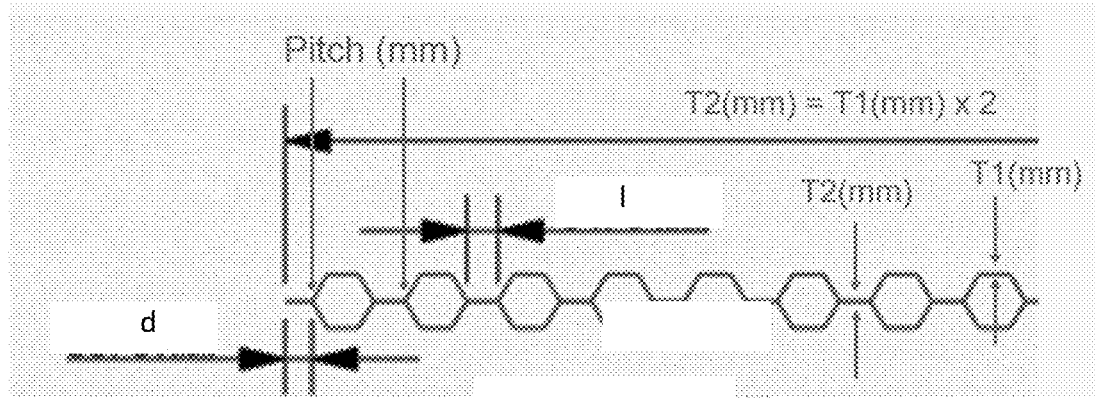
FIGS. 6A and 6B show a side view of energy absorption components of FIGS. 4A and 4B, respectively, with dimension indicators.
Figure 6B:
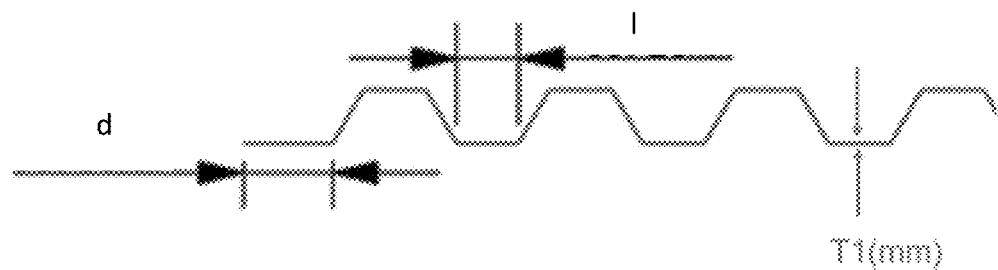
Figure 7A:
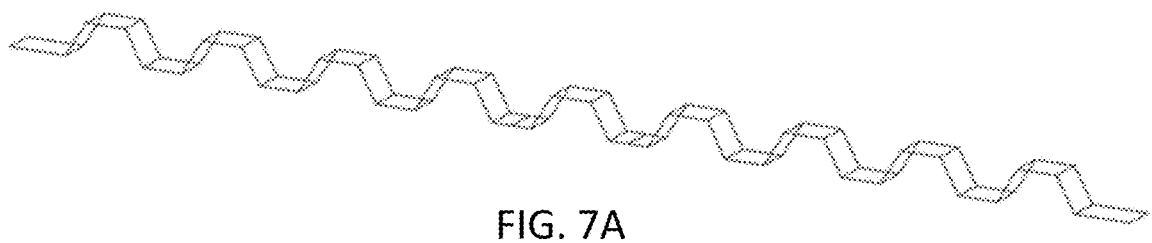
FIGS. 7A-7C show perspective view of various configurations of an energy absorption component of a battery containment system according to embodiments of the present invention.
Figure 7B:
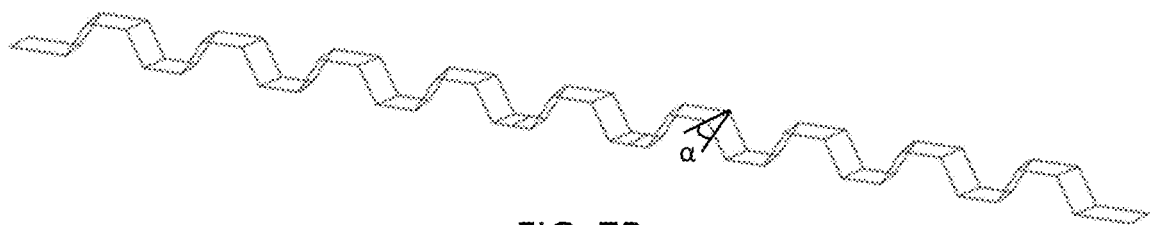
Figure 7C:
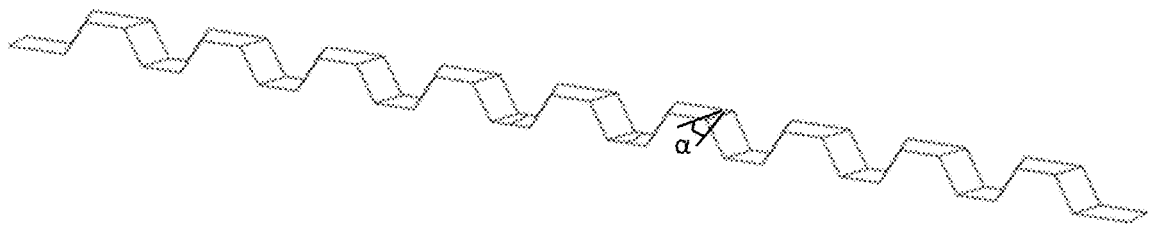
Figure 8A:
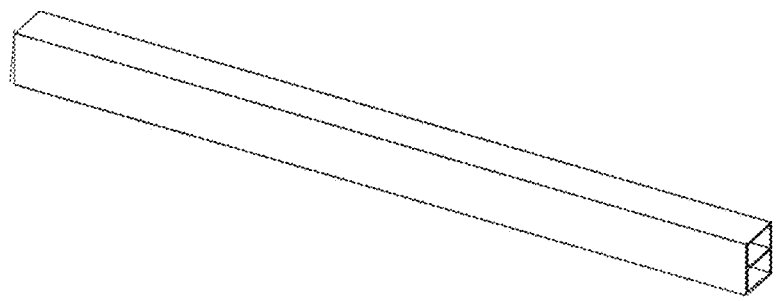
FIGS. 8A and 8B are perspective views of an energy absorption component according to embodiments of the present invention.
Figure 8B:
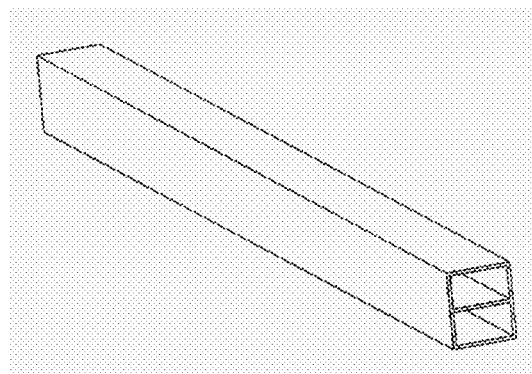
Figure 9A:
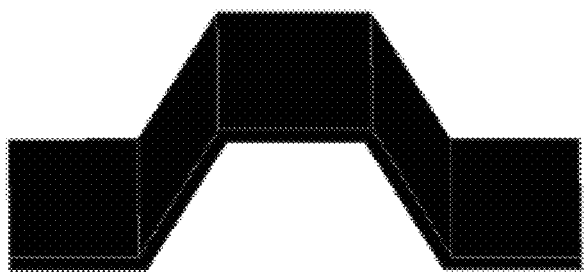
FIGS. 9A-9D are a front perspective view, a perspective view, a front view, and a top view, respectively of a portion of an energy absorption component according to embodiments of the present invention.
Figure 9B:
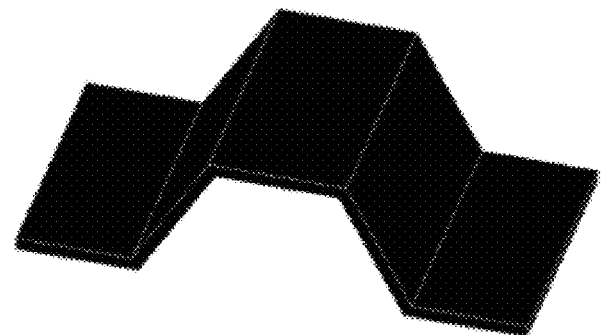
Figure 9C:
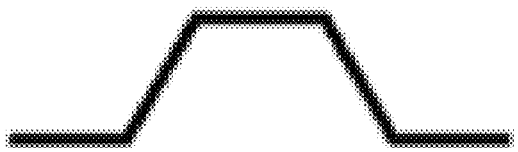
Figure 9D:
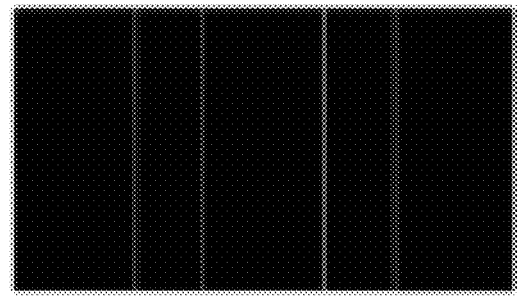
Figure 10A:
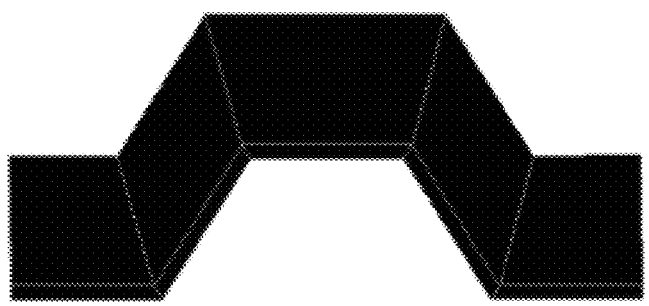
FIGS. 10A-10D are a front perspective view, a perspective view, a front view, and a top view, respectively of a portion of an energy absorption component according to embodiments of the present invention.
Figure 10B:
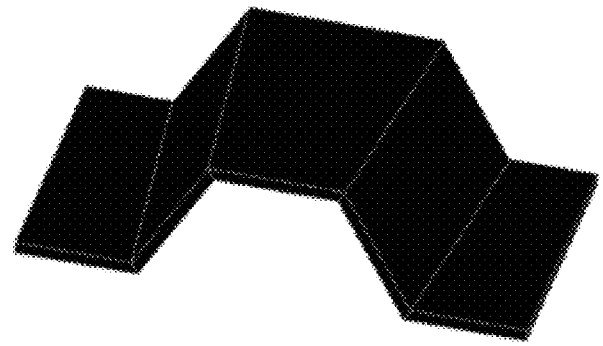
Figure 10C:
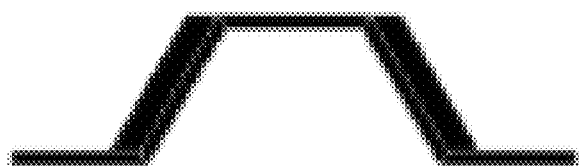
Figure 10D:
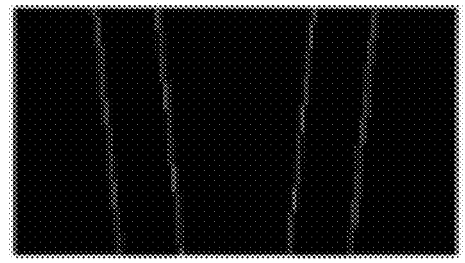
Figure 11:
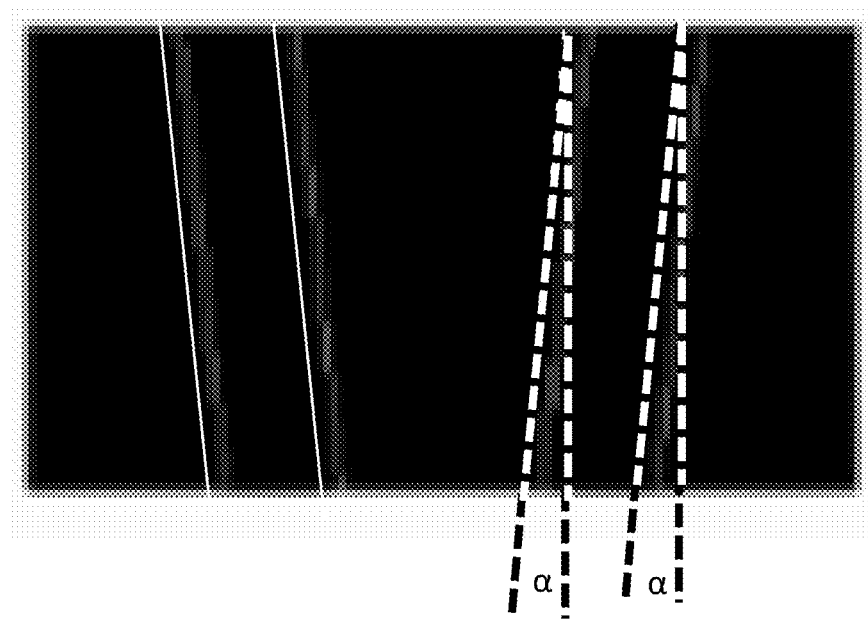
FIG. 11 is the top view of the energy absorption component of FIG. 10D with reference lines detailing angle α.

The geometry, including the length L, width W, and height H, along with internal dimensions including the length of each individual shape 1, distance between each shape d, pitch p, wall thickness T1, T2, and wall angle α, of each of the third energy absorption component 72 may be tuned to achieve various characteristics depending on design considerations and requirements of a particular containment system 10. The length of each individual shape 1, distance between each shape d, pitch p, and wall thickness T1, T2 are shown in FIGS. 6A and 6B, which are detailed views of FIGS. 4A and 4B. Wall angle α is shown in FIGS. 7B-7C and 11. Notably, the component shown in FIG. 7A is the same as the component shown in FIG. 4B. It will be understood that these dimensions are applicable to the various shapes of the third energy absorption component 72 shown throughout FIGS. 4A-4R, but are not labeled in each figure for clarity. For example, as best shown in the exemplary shapes of FIGS. 4B, 4C, and 4D, the length 1 of each repeated shape and the distance d between each repeated shape can be increased or decreased to vary the strength characteristics of the third energy absorption component 72. According to certain inventive embodiments, the distance d between the repeated shapes is 0 to 300 mm. According to certain inventive embodiments, the length of each repeated shape is 20 to 300 mm. According to certain inventive embodiments, the pitch is 45 to 120 degrees. According to certain inventive embodiments, the thickness T1 is 0.25 to 5 mm and the thickness T2 is 0.25 to 10 mm in the case of steel. In the case of a carbon fiber composite material, thickness T1 is preferably 7 to 13 mm, and thickness T2 is preferably 14 to 24 mm. According to certain inventive embodiments, the thickness T2 is two times the thickness to T1. According to certain inventive embodiments, the wall angle α or tilt inward toward the voids 34 of the upward extensions of the repeated shapes is 0 to 25 degrees. For example, in FIG. 7A the wall angle α is 0 degrees, in FIG. 7B the wall angle α is 5 degrees, and in FIG. 7C the wall angle α is 12.5 degrees.

Figure 12:
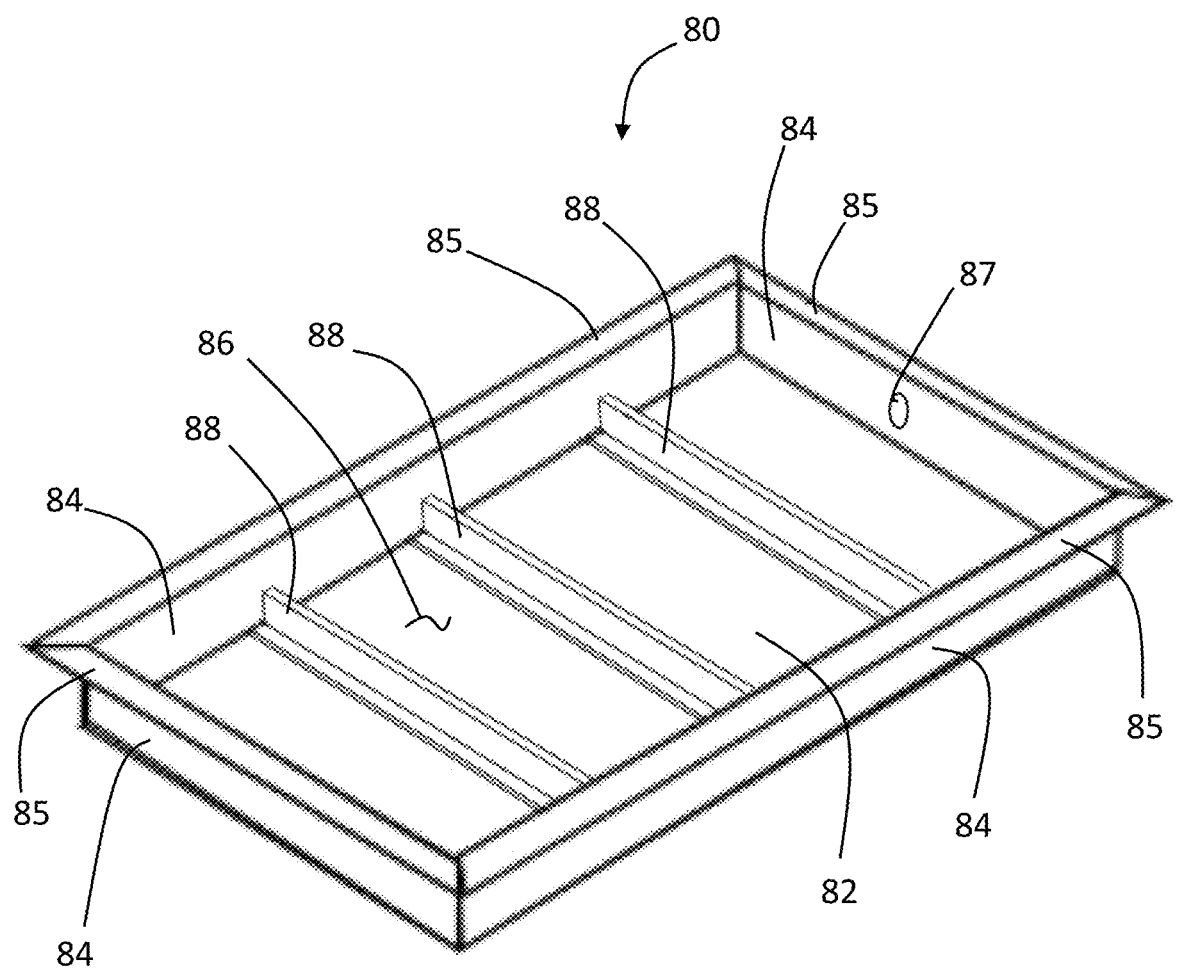
FIG. 12 is a perspective view of a tray of a battery containment system according to an embodiment of the present invention.

As shown in FIG. 12, the tray 80 of an inventive battery containment system 10 includes a bottom 82 and walls 84 that extend from one side of the bottom 82 of the tray 80. The walls 84 and the bottom 82 define a cavity 86 within the tray 80. According to embodiments, the tray 80 includes a flange 85 that extends outward from the walls 84 of the tray 80. The flange 85 of the tray 80 is configured to engage with the upper portion 28 of the interior component 22 of the tray 20. The tray 80 is configured to receive batteries 150 within the cavity 86. The tray 80 is configured to nest within the cavity 29 of the frame 20. According to embodiments, the tray 80 includes a plurality of divider walls 88, which divide the cavity 86 into sections of sub-cavities. The internal divider walls 88 extend from the bottom 82 of the tray 80 between the opposite side walls 84. The internal divider walls 88 provide additional structural rigidity to the battery containment system 10 and provide support to batteries 150 positioned within the tray 80 to limit shifting of the batteries 150 within the tray 80. According to embodiments, the tray 20 also includes a through hole 87 defined in at least one of the walls 84. The through hole 87 allows a wire or cable to be passed therethrough, such as a high voltage wire for connecting the batteries 150 contained within the battery containment system 10 to the other systems of the hybrid or electric vehicle systems. In FIGS. 1 and 12, the through hole 87 is defined in an end wall 84; however it will be understood that a through hole 87 may be provided in any of the plurality of walls 84, the cover 90, or the bottom 82 of the tray 80 based on design requirements and routing of a high voltage wire for connecting the batteries 150 to other systems of the hybrid or electric vehicle.

According to embodiments, the tray 80 is formed of a reinforced sheet molding compound (SMC), epoxy, acrylonitrile butadiene styrene (ABS), polycarbonate, or random-oriented fiber reinforced thermoplastic resin (FRTP). Thermoplastic materials referred to herein include but are not limited to poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the tray 80 is formed of glass fiber reinforced SMC or carbon fiber reinforced SMC. According to embodiments, the material forming the tray 80 includes an EMI-RFI shielding filler which illustratively include nickel coated glass mat; carbon fiber matting; copper or nickel paint; various metal foils, such as aluminum, nickel, iron, copper, and alloys thereof; and or combinations thereof with the proviso that the tray 80 is grounded so as to function as a Faraday cage.

As shown in FIG. 1, the cover 90 includes a cover body portion 92 and a first flange 96 that extends from the cover body portion 92. The cover body portion 92 of the cover 90 may include a plurality of walls 94 from which the flange 96 extends such that the flange and the cover body portion 92 are in separate planes. According to embodiments, the first flange 96 of the cover 90 extends from the cover body portion 92 such that the cover 90 is a substantially planar component. The cover body portion 92 of the cover is configured to overlie the cavity 86 within the tray 80 and the plurality of walls 84 of the tray 80. The first flange 96 of the cover 90, which extends from the cover body portion 92, is configured to extend beyond the plurality of walls 84 of the tray 80.

According to embodiments, the frame 20, the tray 80, the cover 90, or a combination thereof are coated in a fire resistant, or a fire-retardant material. A fire-resistant material is one that is designed to resist burning and withstand heat and provide insulation to the substrate, while a fire-retardant material is designed to burn slowly and reduce the rate of flame spread. Intumescent fire-resistant materials work by expanding their volume from 15 to 30 times and generating an ash-like char layer that erodes as fire exposure continues. Expansion then occurs again with the number of times the process repeats itself dependent upon the thickness of the coating. For example, such fire resistant or fire retardant materials for packing in the first volume V1 and/or the second volume V2 of the frame 20 or coating any of the frame 20, the tray 80, and the cover 90 include any of the following: silicone, casein or vinyl resins, aluminum trihydrate or antimony oxide, ammonium polyphosphate, pentaerythritol, melamine derivatives, boric acid ($H_3BO_3$) and borax ($Na_2B_4O_7 \cdot 10H_2O$), disodium octaborate tetrahydrate ($Na_2B_8O_{13} \cdot 4H_2O$), dicyandiamide-formaldehyde-phosphoric acid, melamine-dicyandiamide-formaldehyde-phosphoric acid, poly(n-vinylpyrolidone), colloidal silica, magnesium hydroxide (MDH), monoammonium phosphate (MAP), aluminum hydroxide (ATH), carbonates and hydrogen carbonates, potassium carbonate, $Na_2WO_4$, $Na_2SnO_3$, $Na_2MoO_4$, ammonium polyphosphate, pentaerythritol, melamine, expandable graphite, or combinations thereof. Phenolic resins operative herein illustratively includes epoxy phenolic resins, and phenol formaldehyde resins that impart corrosion resistance and a mar resistance surface relative to the underlying substrate of the system 10. EMI-RFI shielding coatings operative herein illustratively include nickel coated glass mat; carbon fiber matting; copper or nickel paint; various metal foils, such as aluminum, nickel, iron, copper, and alloys thereof; and or combinations thereof with the proviso that the EMI-RFI shielding is grounded so as to function as a Faraday cage. It is further appreciated that coatings in the form of sheets are readily applied as an underlying sheet below an inventive system 10 or are included as filler in the materials that are used to form the frame 20, the tray 80, and the cover 90.

According to certain inventive embodiments, the cover 90 is formed of reinforced sheet molding compound (SMC), a phenolic-SMC, epoxy, acrylonitrile butadiene styrene (ABS), polycarbonate, random-oriented fiber reinforced thermoplastic resin (FRTP), steel, or aluminum. Sheet molding compound (SMC) or sheet molding composite is a ready to mold fiber-reinforced polyester material primarily used in compression molding. SMC is a reinforced composite material that is manufactured by dispersing long strands (20-60 mm) of chopped glass fibers in a matrix of polyester resin. It is appreciated that fibers with long range order are also operative herein and include woven mats, continuous fibers, or sheet forms. Thermoplastic materials operative herein amenable to functioning as a fiber matrix illustratively include: poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, or block copolymers of any one of the aforementioned constituting the majority by monomer number. Reinforcing fibers and fillers operative herein illustratively include carbon fibers, glass fibers, aramid fibers, cellulosic fibers, or a combination thereof. In some inventive embodiments, the chopped fiber is glass fiber, alone or in combination with other types of fiber or reinforcing fillers. According to embodiments, the cover 90 is formed of glass fiber reinforced SMC. As noted above, a coating is readily applied to a cover 90 in some inventive embodiments. According to embodiments, the material forming the cover 90 includes an EMI-RFI shielding filler which illustratively include nickel coated glass mat; carbon fiber matting; copper or nickel paint; various metal foils, such as aluminum, nickel, iron, copper, and alloys thereof; and or combinations thereof with the proviso that the cover 90 is grounded so as to function as a Faraday cage.

Figure 13:
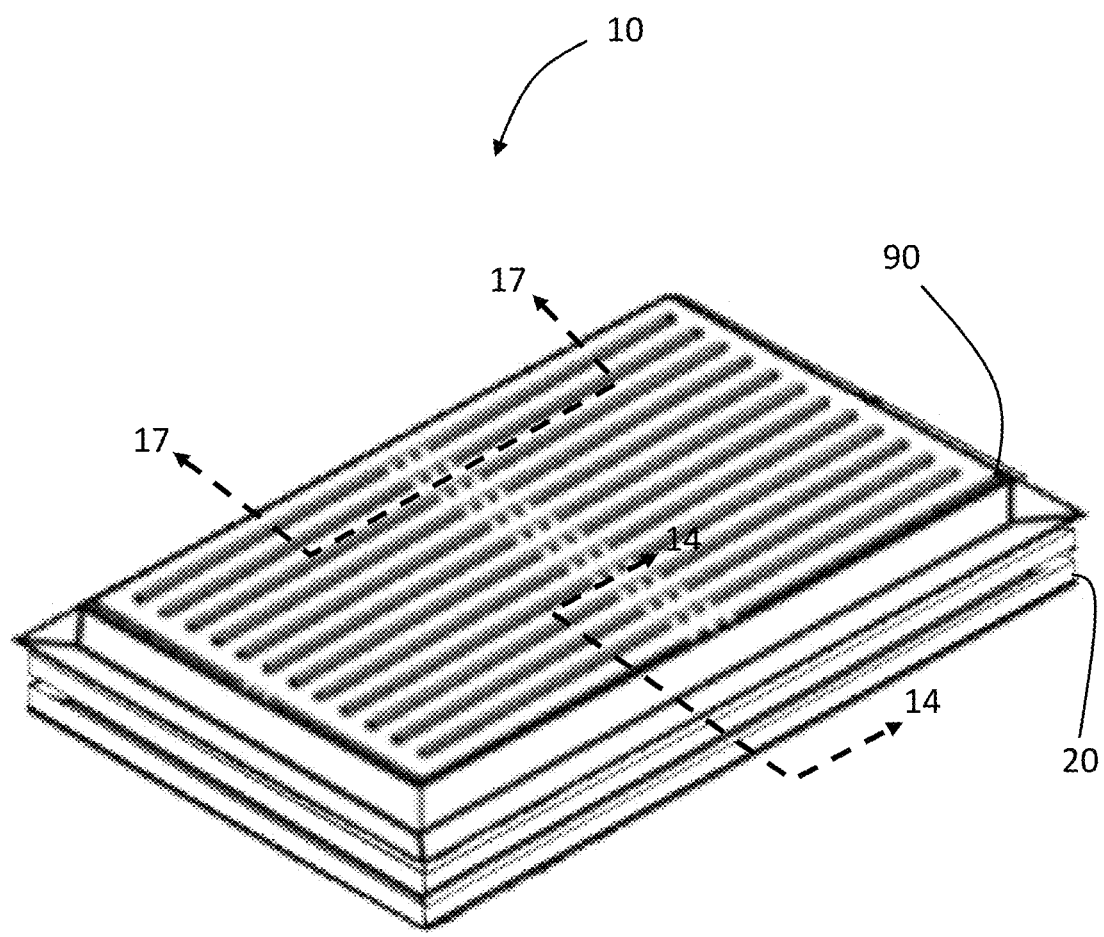
FIG. 13 is a perspective view of an assembled battery containment system according to an embodiment of the present invention.
Figure 14:
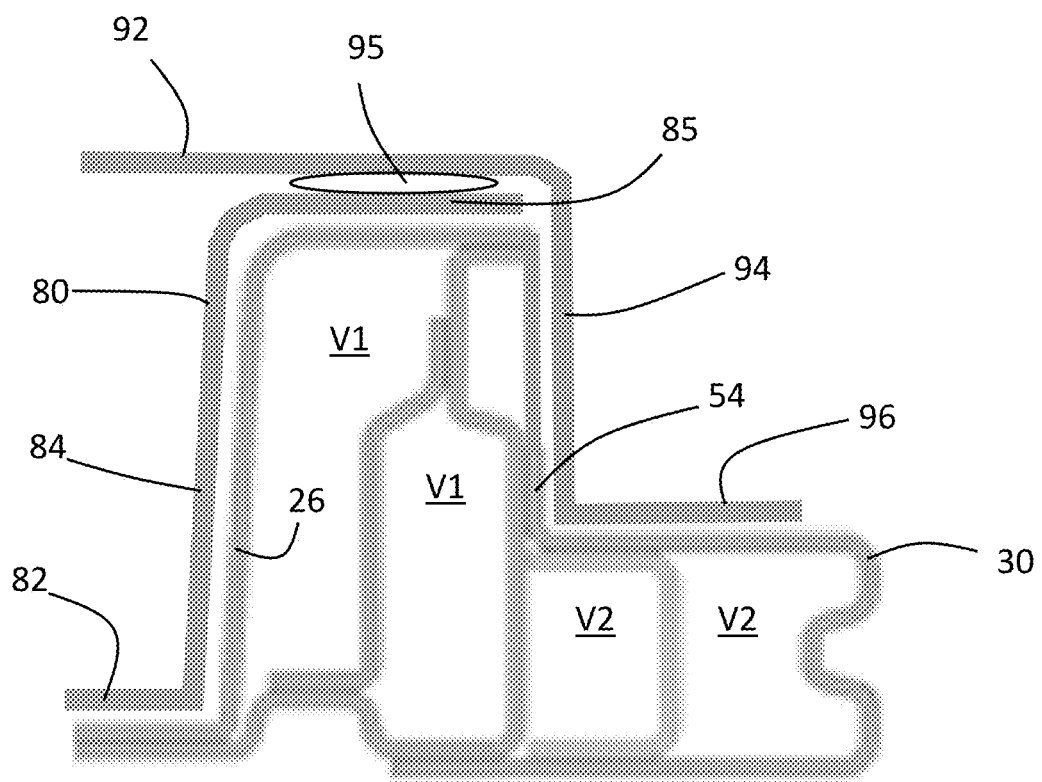
FIG. 14 is a cross-sectional view of the assembled battery containment system oriented along line 14-14 of FIG. 13.
Figure 15:
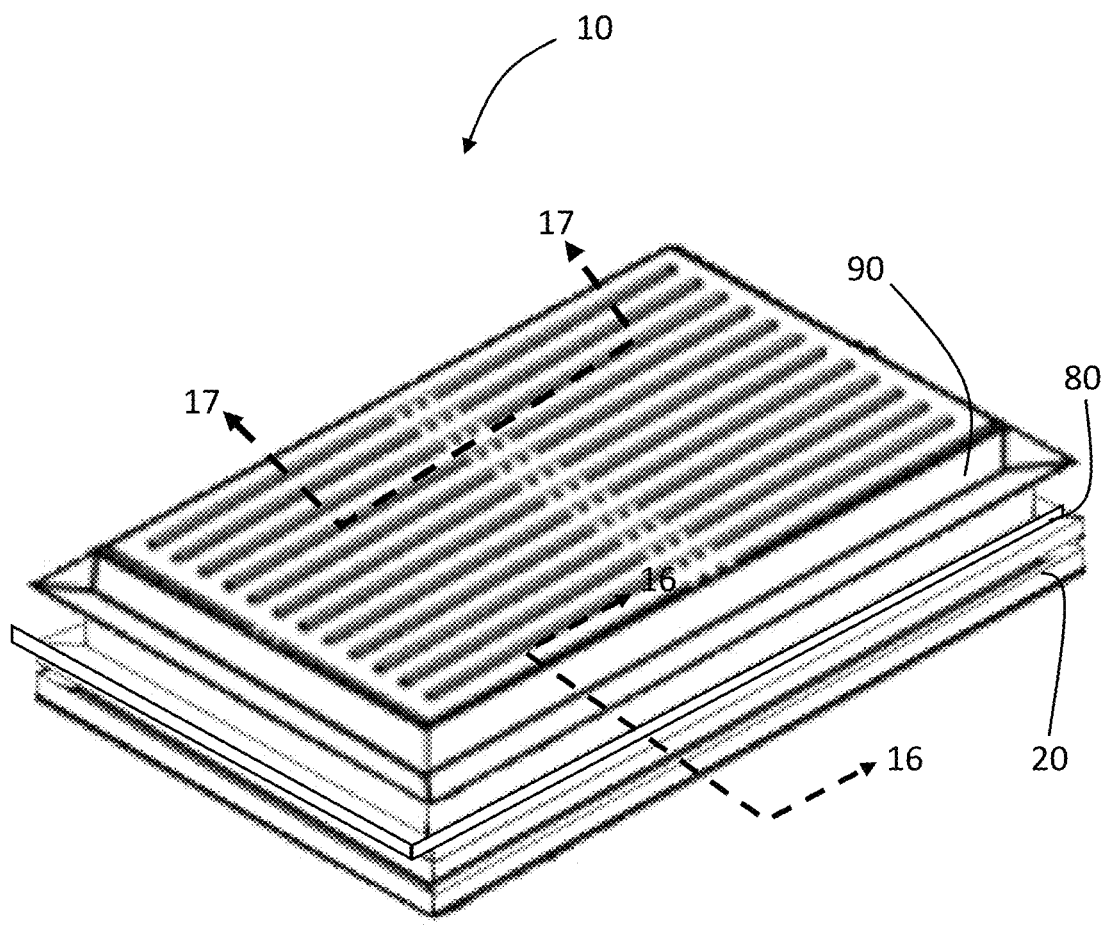
FIG. 15 is a perspective view of an assembled battery containment system according to an embodiment of the present invention.
Figure 16:
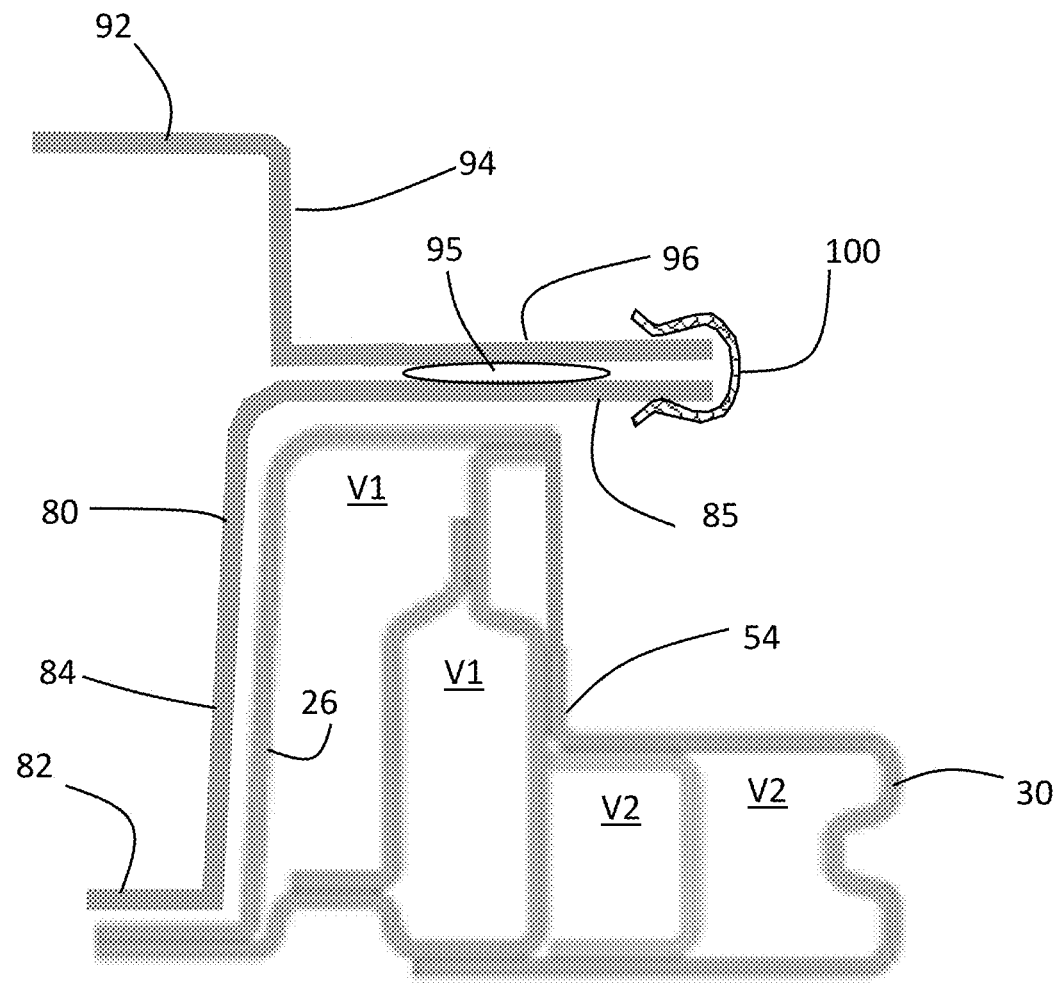
FIG. 16 is a cross-sectional view of the assembled battery containment system oriented along line 16-16 of FIG. 15.

FIGS. 13 and 15 show embodiments of the inventive containment system 10 assembled. FIGS. 14 and 16 show cross sections of the assembled embodiments of FIGS. 13 and 15, respectively. In the embodiment of FIGS. 13 and 14, the cover 90 is friction fit to the frame 20. That is, the walls 94 of the cover engage with the frame 20, for example at the attachment flange 54 of the first energy absorption component 30. As shown in FIG. 14, the cover body portion 92 covers and engages with the flange 85 of the tray 80, which in turn engages with the upper portion 28 of the interior component 22 of the frame 20. In the embodiment of FIGS. 15 and 16, the cover 90 engages with the flange 85 of the tray 80, which in turn engages with the upper portion 28 of the interior component 22 of the frame 20. The cover 90 and the tray 80 are held together by a joiner clip 100. According to embodiments, a seal 95 is provided between the cover body portion 92 the flange 85 of the tray 80. The seal 95 may be provided on either of the cover 90 or the flange 85 of the tray 80. The seal 95 is formed of an elastomeric material. The seal 95 ensures water tight engagement between the tray 80 and the cover 90 and also inhibits wear caused by rubbing between the tray 80 the cover 90.

Figure 17:
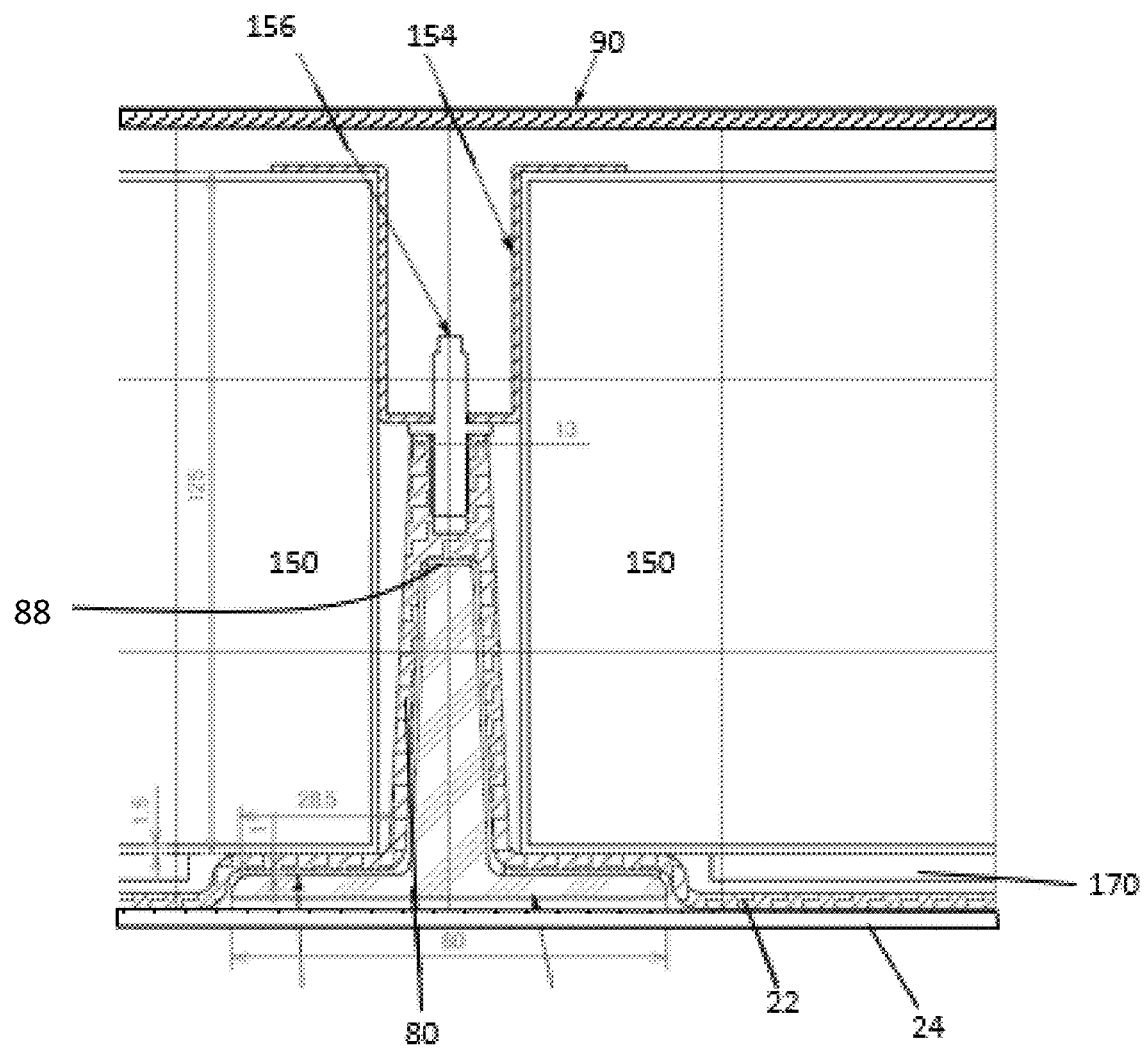
FIG. 17 is a cross sectional view of an assembled batter containment system oriented along lines 17-17 of FIGS. 13 and 15.

Further details of an inventive containment system according to embodiments of the present invention are now described with reference to FIG. 17 which is a detailed cross-sectional view of the assembled system 10 taken along cute line 17-17 as shown in FIGS. 13 and 15. In the cross-sectional view of FIG. 17, a divider wall 88 of a tray 80 is shown. Batteries 150 are shown positioned on opposite sides of the internal divider wall 88 within the tray 80. According to certain inventive embodiments, the batteries 150 sit in direct contact with the bottom 82 of the tray 80. In further inventive embodiments, an intermediate layer of material, for example foam or another suitable shock absorbing material, is positioned between the batteries 150 and the tray 80, along the bottom 82 or the walls 84 of the tray 80. As shown in FIG. 17, embodiments of the inventive battery containment system 10 include a temperature regulation system 170 that can be positioned around or near the batteries. The temperature regulation system 170 may include a water or coolant circulation system or a phase change material. As shown, the temperature regulation system 170 is posited in a downward protrusion formed in the bottom 82 of the tray 80, such that the batteries 150 are positioned on top of the temperature regulation system 170. According to certain inventive embodiments, the batteries 150 are held in a secured position by a bracket 154 that is secured to the tray 80 by a fastener 156. As shown in FIG. 17, the cover 90 is positioned above the batteries 150 and the bottom portion 24 of the interior component 22 of the frame 20 is positioned under the bottom 82 of the tray 80.

Figure 19:
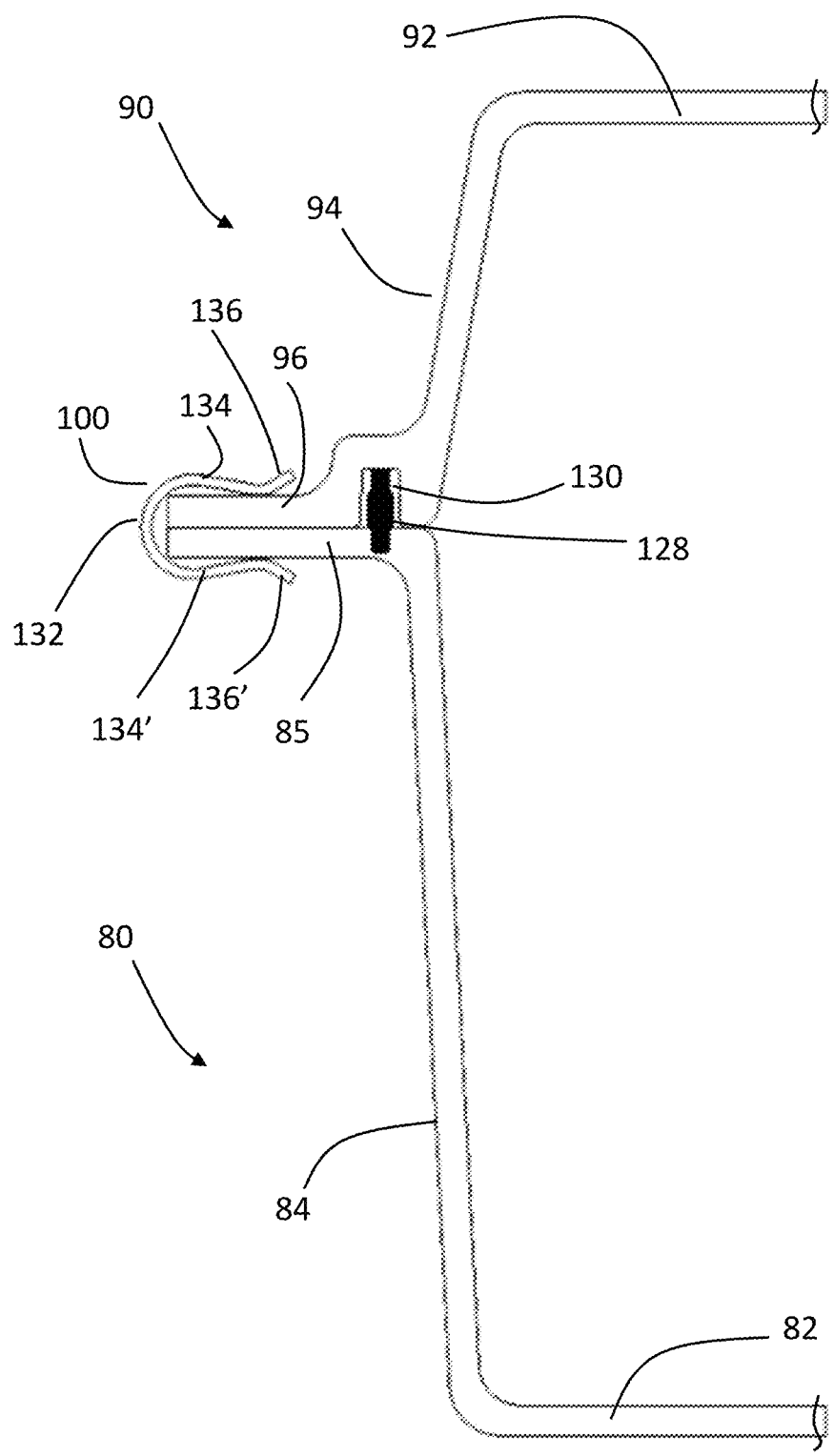
FIG. 19 is a cross sectional view of a cover and a tray of a battery containment system according to embodiments of the present invention.
Figure 20A:
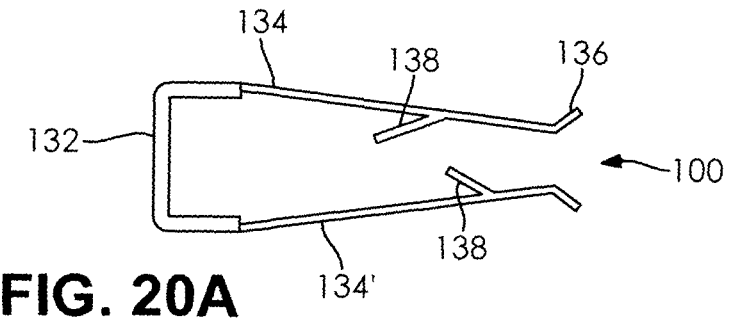
FIGS. 20A-20D are side views of joiner clips according to embodiments of the present invention.
Figure 20B:
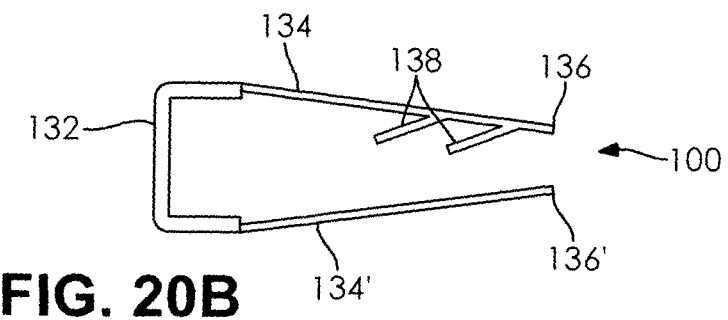
Figure 20C:
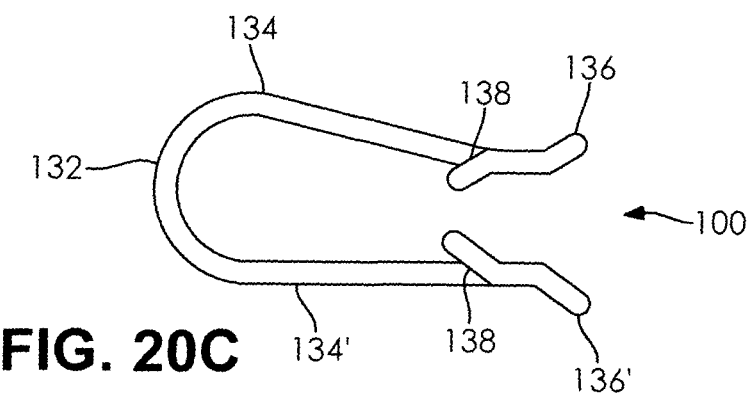
Figure 20D:
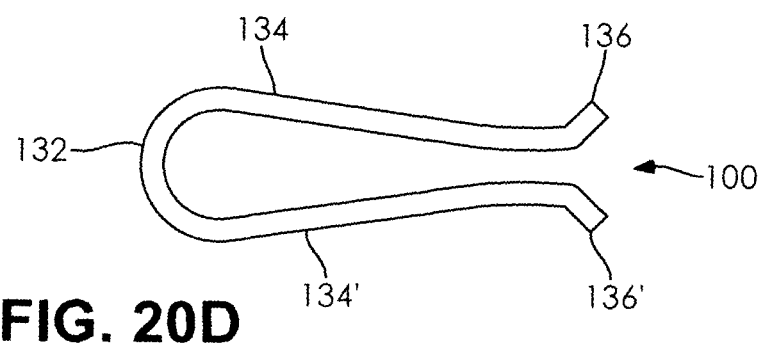

As described above, FIG. 16 shows a cross sectional view of a cover 90 and a tray 80 of the present invention joined together by a joiner clip 100. As shown, joiner clip 100 having a C-shaped cross section joins the cover 90 and the tray 80 together while tray 80 is nested and friction fit or adhesive maintained within the frame 20. The cover 90, the tray 80, and the joiner clip 100 are configured to be assembled with the frame 20 in such a way as to form a high strength, light weight containment system 10 that provides impalement resistance, impact resistance, fire resistance, and fluid penetration prevention to contents contained within the construct 10, which according to embodiments is a plurality of batteries 150. The joiner clip 100 is either a single continuous joiner clip that entirely surrounds the cover 90 and shield tray 80, or the joiner clip 100 is a plurality of separate and discrete joiner clips, positioned at separate locations along the flange 96 of the cover 90 and the flange 85 of the tray 80 to non-continuously surround the cover 90 and the tray 80. FIG. 19 shows a tray 80 and a cover 90 assembled with a joiner clip 100. In FIG. 19 the frame 20 is not shown for visual clarity.

As shown in FIGS. 16, 19, and 20A-20D, the joiner clip 100 includes a base section 132 and a pair of jaws 134, 134' extending from the base 132 section each jaw 134, 134' of the pair of jaws having a free end 136, 136', respectively. According to embodiments, the base section 132 is curved or square, as shown in FIGS. 20C-20D and 20A-20B, respectively. According to embodiments, one or both of the jaws 134, 134' are straight or feature a curve such that the free ends 136, 136' of each of the jaws 134, 134' are flared away from one another, such as shown in FIGS. 20A and 20C-5D and 20B, respectively. The flared free ends 136, 136' facilitate easy application of the joiner clip 100 onto the flanges 96, 85. That is, to apply the joiner clip 100, the flanges 96, 85 are positioned between the free ends 136, 136' of the joiner clip and the joiner clip 100 is pushed or pounded onto the flanges 96, 85, thereby eliminating the need for a special tool for separating the jaws 134, 134'. The flared free ends 136, 136' also reduce wear on the composite material of the flanges 96, 85 by ensuring that the free ends 136, 136' do not rub on the flanges 96, 85.

According to embodiments, the free ends 136, 136' of each of the jaws 134, 134' are biased toward one another. Thus, when the joiner clip 100 is engaged with the flanges 96, 85, such that the flanges 96, 85 are positioned between the jaws 134, 134' of the joiner clip 100, the joiner clip applies a compressive force to the first flange 96 of the cover 90 and the flange 85 of the tray 80 to join the cover 90 and the tray 80 together. According to embodiments, the joiner clip is formed of a metal, such as spring steel, a thermoplastic, or an elastomeric material. Embodiments in which the joiner clip is formed of an elastomeric material provide the additional benefit of sealing the cover 90 and tray 80 while also joining them together. According to embodiments, the joiner clip 100 also includes at least on barb positioned on an inner surface of at least one of the jaws 134, 134'. The barb or barbs 138 are configured to dig into the composite material of the flanges 96, 85 or may engage with a groove formed in the flanges to prevent the joiner clip 100 from falling off of or being easily removed from the flanges 96, 85. It will also be understood that in some embodiments the upper portion 28 of the interior component 22 of the frame 20 extends outward further than the flange 85 of the tray, and in such embodiments, the joiner clip 100 may be used to join the flange 96 of the cover 90 with the upper portion 28 of the interior component 22 of the try 20 in the same way as described herein, including the use of a seal 95.

According to embodiments, the containment construct 10 also includes a barrier material 95 positioned between the first flange 96 and the second flange 85. According to embodiments, the barrier material 95 acts as a seal and/or a connector between the first cover 90 and the tray 80 to limit movement or slippage between the cover 90 and the tray 80. According to embodiments, the barrier material 95 is any of an adhesive, a gasket, or a connector. In some embodiments, such as that shown in FIG. 19, at least one of the first flange 96 and second flange 85 define a channel 130 that is configured to receive and retain the barrier material 95. The channel 130 may be a continuous channel or may be a plurality of discrete channels spaced along the length of the flanges 96, 85 at spaced apart positions. According to embodiments in which at least one of the flanges 96, 85 includes a channel, the barrier material 95 is placed in the channel 130 before the flanges 96, 85 are brought into contact with one another. According to embodiments, in which both flanges 96, 85 define a channel 130 therein, the barrier material 95 is placed in the channel 130 of for example the first flange 96 and then the second flange 85 is brought into contact with the first flange 96 and the barrier material. In such embodiments, the barrier material 95 can be used as a position locator for ensuring that the first flange 96 and second flange 85 are properly positioned relative to one another. Additionally, once assembled, the barrier material 95 ensures that the cover 90 and the tray 80 remain properly positioned relative to one another during use, by preventing slippage, which in turn reduces wear on the parts. It will also be understood that when the barrier material 95 is a gasket, the barrier material may act to seal the cover 90 and tray 80 in water tight engagement and act to locate and retains the cover 90 and tray 80 relative to one another.

According to certain inventive embodiments, a containment system 10 has dimensions suitable to contain batteries 150 of an electric or hybrid vehicle. According to embodiments, the overall dimensions of the assembled battery containment system 10 are a height from the bottom of the frame 20 to the top of the cover 90 of 100 to 500 mm, an overall flange to flange length of 100 to 5000 mm, and an overall flange to flange width of 100 to 3000 mm. According to embodiments, multiple layers of batteries 150 are stacked within the containment system 10, resulting in taller containment systems. According to embodiments, multiple layers of containment systems 10 are stacked.

The present invention is further detailed with respect to the following non-limiting examples. These examples are exemplary of specific embodiments of the present invention and not intended to limit the scope of the appended claims.

EXAMPLES

Embodiments of the inventive battery containment system 10 were constructed having various forms of the third energy absorption component 72. These battery containment systems 10 were subjected to impact testing using a quasi-static load by a 10 inch (25 cm) diameter rigid column located at the center of the system and traveling perpendicular into a predominate longitudinal or lateral edge of the battery containment system 10 as shown in the schematic in FIG. 18.

In a first example, battery containment systems 10 including energy absorption component 72 formed of steel (SPFC590) having various geometries are tested for comparison. In this example, the containment systems are subjected to 250 J impacts at an impact angle of 90 degrees. As shown in Table 1, different repeating shapes are tested as well as different thicknesses T1 and T2 and pitches p. The mass of each component and the deformation results of the impact testing are reported in Table 1.

TABLE 1

Figure 4B:
Figure 4C:
Figure 4D:
Figure 4E:
Figure 4F:
Figure 4G:
Figure 4H:
Figure 4I:
Figure 4J:
Figure 5A:
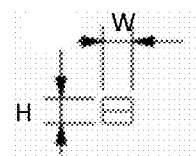
FIGS. 5A-5R show an end view of the configurations of an energy absorption component of a battery containment system of FIGS. 4A-4R, respectively.
Figure 5B:
Figure 5C:
Figure 5D:
Figure 5E:
Figure 5F:
Figure 5G:
Figure 5H:
Figure 5I:
Figure 5J:

| Analysis File | Shape/ Reference FIG. | T1 mm | T2 mm | Mass kg | pitch mm | Deformation mm |
|---|---|---|---|---|---|---|
| EA-1 | FIG. 4A | 0.73 | 1.46 | 1.33 | 104.5 | 11.9 |
| EA-2 | FIG. 4B | 0.93 | — | 1.33 | 207.8 | 18.3 |
| EA-3 | FIG. 4C | 1.01 | — | 1.33 | 323.3 | 28.4 |
| EA-4 | FIG. 4D | 1.11 | — | 1.33 | 577.3 | 49.6 |
| EA-5 | FIG. 4E | 0.71 | 1.41 | 1.33 | 90 | 8.1 |
| EA-7 | FIG. 4F | 0.89 | — | 1.33 | 180 | 16.3 |
| EA-12 | FIG. 4G | 1.08 | — | 1.32 | 360 | 44 |
| EA-9 | FIG. 4H | 0.22 | — | 1.33 | — | >70 |
| EA-10 | FIG. 4I | 0.26 | — | 1.33 | — | >70 |
| EA-11 | FIG. 4J | 0.23 | — | 1.33 | — | >70 |
| EA-2 | FIG. 4B | 0.930 | — | 1.33 | 207.8 | 18.3 |
| EA-9-2 | FIG. 4H | 0.620 | — | 3.77 | — | 18.4 |
| EA-10-2 | FIG. 4I | 0.690 | — | 3.55 | — | 18.4 |
| EA-11-2 | FIG. 4J | 0.790 | — | 4.68 | — | 18.2 |

In a second example, battery containment systems 10 including third energy absorption component 72 formed of steel (SPFC590) having an open hexagon repeating shape are tested to compare the effects of varying the wall angle α. In this example, the containment systems are subjected to 250 J impacts at an impact angles of 90 and 75 degrees. As shown in Table 2, in this example the thicknesses T1 and T2, pitch p, and mass are generally unchanged. The deformation results of the impact testing are reported in Table 2.

TABLE 2

| Analysis file | Shape/ Reference FIG. | t1 mm | Mass kg | pitch mm | Deformation mm | wall angle | Impact angle |
|---|---|---|---|---|---|---|---|
| EA-2 | FIG. 7A (FIG. 4B) | 0.93 | 1.33 | 207.8 | 18.3 | 0 | 90 |
| EA-13 | FIG. 7B | 0.93 | 1.33 | 207.8 | 19.5 | 5 | 90 |
| EA-14 | FIG. 7C | 0.92 | 1.33 | 207.8 | 19.7 | 12.5 | 90 |
| EA-2-obli | FIG. 7A (FIG. 4B) | 0.93 | 1.33 | 207.8 | 19.8 | 0 | 75 |
| EA-13-obli | FIG. 7B | 0.93 | 1.33 | 207.8 | 19.4 | 5 | 75 |
| EA-14-obli | FIG. 7C | 0.92 | 1.33 | 207.8 | 19.9 | 12.5 | 75 |

In a third example, battery containment systems 10 including third energy absorption component 72 formed of steel (SPFC590), aluminum (A5052), and CFRTP (Teijin-SEREEBO®) having various geometries are tested for comparison. In this example, the containment systems are subjected to 250 J impacts at an impact angle of 90 degrees. Table 3 reports the details of the different geometries tested and resulting impact deformations for each material.

TABLE 3

| Analysis file | Shape/ Reference FIG. | Material | t1 mm | t2 mm | Mass kg | pitch mm | Deformation mm |
|---|---|---|---|---|---|---|---|
| EA-1-2 | FIG. 4A | Steel (SPFC590) | 0.33 | 0.66 | 0.60 | 104.5 | 18.2 |
| EA-2 | FIG. 4B | Steel (SPFC590) | 0.93 | — | 1.33 | 207.8 | 18.3 |
| EA-11-2 | FIG. 4J | Steel (SPFC590) | 0.79 | — | 4.68 | — | 18.2 |

TABLE 3-continued

| Analysis file | Shape/ Reference FIG. | Material | t1 mm | t2 mm | Mass kg | pitch mm | Deformation mm |
|---|---|---|---|---|---|---|---|
| EA-1-Al | FIG. 4A | Aluminum(A5052) | 0.82 | 1.64 | 0.52 | 104.5 | 18.6 |
| EA-2-Al | FIG. 4B | Aluminum (A5052) | 1.90 | — | 0.94 | 207.8 | 18.7 |
| EA-9-Al | FIG. 4H | Aluminum(A5052) | 0.95 | — | 2.00 | — | 18.8 |
| EA-1-Se | FIG. 4A | CFRTP(Teijin-SEREEBO®)) | 1.40 | 2.80 | 0.45 | 104.5 | 17.9 |
| EA-2-Se | FIG. 4B | CFRTP(Teijin-SEREEBO®)) | 3.00 | — | 0.75 | 207.8 | 18.7 |

In a fourth example, like the third example, battery containment systems 10 including energy absorption component 72 formed of steel (SPFC590), aluminum (A5052), and CFRTP (Teijin-SEREEBO®) having various geometries are tested for comparison. In this example, the containment systems are subjected to 250 J impacts at an impact angle of 90 degrees. Table 4 reports the details of the different geometries tested and resulting impact deformations for each material.

TABLE 4

| Analysis file | Shape/ Reference FIG. | Material | Ply | Percent of 0° ply | t1 mm | Mass kg | pitch mm | Deformation mm |
|---|---|---|---|---|---|---|---|---|
| EA-2 | FIG. 4B | Steel (SPFC590) | — | — | 0.93 | 1.33 | 207.8 | 18.3 |
| EA-11-2 | FIG. 4J | Steel (SPFC590) | — | — | 0.79 | 4.68 | — | 18.2 |
| EA-2-Al | FIG. 4B | aluminum (A5052) | — | — | 1.90 | 0.94 | 207.8 | 18.7 |
| EA-9-Al | FIG. 4H | aluminum (A5052) | — | — | 0.95 | 2.00 | — | 18.8 |
| EA-2-Se | FIG. 4B | CFRTP (Teijin-SEREEBO(R)) | — | — | 3.00 | 0.75 | 207.8 | 18.7 |
| EA-2-CFRP | FIG. 4B | CFRP(DSM, PA410) | [0/45/−45]s | 50 | 1.92 | 0.51 | 207.8 | 17.7 |
| EA-9-CFRP | FIG. 4H | CFRP(DSM, PA410) | [0/90]s | 25 | 0.80 | 0.90 | — | 17.6 |
| EA-2-GFRP | FIG. 4B | GFRP(DSM, PA410) | [0/45/−45]s | 50 | 2.72 | 0.85 | 207.8 | 17.9 |
| EA-9-GFRP | FIG. 4H | GFRP(DSM, PA410) | [0/90]s | 25 | 1.12 | 1.49 | — | 18.5 |

In a fifth example, battery containment systems 10 including energy absorption component 72 formed of CFRP (DSM, PA410) having a repeating open hexagon shape and an extruded rectangular shape of various geometries are tested for comparison of ply. In this example, the containment systems are subjected to 250 J impacts at an impact angle of 90 degrees. The results of these tests are shown in Table 5.

TABLE 5

| Analysis file | Shape/ Reference FIG. | Material | Ply | Percent of 0° ply | t1 mm | Mass kg | pitch mm | Deformation mm |
|---|---|---|---|---|---|---|---|---|
| EA-2-CFRP-1 | FIG. 4B | CFRP | 0 | 100 | 5.000 | 1.33 | 207.8 | 33.6 |
| EA-2-CFRP-2 | FIG. 4B | CFRP | [0/90]s | 50 | 5.000 | 1.33 | 207.8 | 5.7 |
| EA-2-CFRP-3 | FIG. 4B | CFRP | [0/45/−45]s | 50 | 5.000 | 1.33 | 207.8 | 5.1 |
| EA-2-CFRP-4 | FIG. 4B | CFRP | [0/45/−45]s | 75 | 5.000 | 1.33 | 207.8 | 5.6 |
| EA-2-CFRP-5 | FIG. 4B | CFRP | [0/45/−45]s | 25 | 5.000 | 1.33 | 207.8 | 5.2 |
| EA-2-CFRP-6 | FIG. 4B | CFRP | [45/−45]s | 0 | 5.000 | 1.33 | 207.8 | 6.4 |
| EA-9-CFRP-1 | FIG. 4H | CFRP | 0 | 100 | 1.180 | 1.33 | — | >70 |

TABLE 5-continued

| Analysis file | Shape/ Reference FIG. | Material | Ply | Percent of 0° ply | t1 mm | Mass kg | pitch mm | Deformation mm |
|---|---|---|---|---|---|---|---|---|
| EA-9-CFRP-2 | FIG. 4H | CFRP | [0/90]s | 50 | 1.180 | 1.33 | — | 15.8 |
| EA-9-CFRP-3 | FIG. 4H | CFRP | [0/45/−45]s | 50 | 1.180 | 1.33 | — | 19.7 |
| EA-9-CFRP-4 | FIG. 4H | CFRP | [0/90]s | 75 | 1.180 | 1.33 | — | 22.6 |
| EA-9-CFRP-5 | FIG. 4H | CFRP | [0/90]s | 25 | 1.180 | 1.33 | — | 9.9 |
| EA-9-CFRP-6 | FIG. 4H | CFRP | 90 | 0 | 1.180 | 1.33 | — | >70 |

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A frame for a battery containment system, said frame comprising:
  an interior component having a bottom portion, a plurality of wall portions extending from the bottom portion, and a plurality of upper portions each extending from one of the wall portions, the bottom portion and the plurality of wall portions defining a cavity;
  a first support component having a base portion, a wall portion extending from the base portion of said first support component, and an upper end extending from the wall portion of said first support component, the base portion of said first support component partially underlying the bottom portion of said interior component and the upper end of said first support component underlying and attached to the upper portion of said interior component, said interior component and said first support component defining a first volume therebetween; and
  a first energy absorption component having a base portion, a wall portion extending from the base portion of said first energy absorption component, an upper portion extending from the wall portion of said first energy absorption component, and an attachment flange extending from the upper portion of said first energy absorption component, the base portion of said first energy absorption component attached to said first support component and the attachment flange of said first energy absorption component attached to said first support component, said first support component and said first absorption component defining a second volume therebetween.

2. The frame of claim 1 further comprising a second energy absorption component disposed within the second volume.

3. The frame of claim 2 wherein said second energy absorption component has a base portion, a wall portion extending from the base portion of said second energy absorption component, and an upper portion extending from the wall portion of said second energy absorption component.

4. The frame of claim 3 wherein the wall portion of said second energy absorption component includes an inwardly extending ridge.

5. The frame of claim 4 wherein the inwardly extending ridge of said second energy absorption component is located in the center of the wall portion of said second energy absorption component.

6. The frame of claim 2 wherein said second energy absorption component externally surrounds said first support component.

7. The frame of claim 1 further comprising a second support component disposed within the first volume.

8. The frame of claim 7 wherein said second support component has a wall portion, a first attachment flange extending from a first end of the wall portion of said second support component, and a second attachment flange extending from a second end of the wall portion of said second support component, the first attachment flange of said second support component being attached to the base portion of said first support component and the second attachment flange of said second support component being attached to the wall portion of said first support component.

9. The frame of claim 8 wherein the first attachment flange of said second support component perpendicularly extends from the wall portion of the said second support component.

10. The frame of claim 1 wherein each of the walls of the plurality of wall portions extend perpendicularly from the bottom portion.

11. The frame of claim 1 wherein the each of the upper portions of the plurality of upper portions extend perpendicularly from one of the wall portions.

12. The frame of claim 1 wherein the each of the upper portions of the plurality of upper portions extend from one of the wall portions in a direction away from the cavity of said interior component.

13. The frame of claim 1 wherein the base portion of said first support component is attached to the bottom portion of said interior component.

14. The frame of claim 1 wherein said first support component externally surrounds said interior component.

15. The frame of claim 1 wherein the base portion of said first energy absorption component attached to the base portion of said first support component.

16. The frame of claim 1 further comprising a bumper attached to the wall portion of said first energy absorption component, said bumper extending away from said frame.

17. The frame of claim 1 wherein said frame further comprises a coating that is at least one of fire resistant, fire retardant, phenolic, or electromagnetic interference-radiofrequency interference (EMI-RFI) shielding.

18. The frame of claim 1 wherein at least one of the first volume and second volume is filled with at least one of a fire resistant material and a fire retardant material.

19. A battery containment system comprising:
a frame of claim 1;
a unitary battery tray having a bottom and a plurality of walls extending from the bottom of said tray and defining a cavity within said tray, said tray being configured to nest within the cavity of said frame; and
a cover having a cover body portion and a first flange extending from the cover body portion, the cover body portion configured to overlie the cavity within said tray and the plurality of walls of said tray, the first flange of said cover configured to extend beyond the plurality of walls of said tray.

* * * * *